United States Patent
Adjabeng

(10) Patent No.: US 11,779,857 B2
(45) Date of Patent: *Oct. 10, 2023

(54) DISTILLATION AND ROTARY EVAPORATION APPARATUSES, DEVICES AND SYSTEMS

(71) Applicant: Ecodyst, Inc., Apex, NC (US)

(72) Inventor: George Adjabeng, Apex, NC (US)

(73) Assignee: Ecodyst, Inc., Apex, NC (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/157,376

(22) Filed: Jan. 25, 2021

(65) Prior Publication Data

US 2021/0236953 A1 Aug. 5, 2021

Related U.S. Application Data

(63) Continuation of application No. 16/429,150, filed on Jun. 3, 2019, now Pat. No. 10,898,828, which is a
(Continued)

(51) Int. Cl.
*B01D 3/08* (2006.01)
*B01D 5/00* (2006.01)
(Continued)

(52) U.S. Cl.
CPC .......... *B01D 3/085* (2013.01); *B01D 1/0041* (2013.01); *B01D 3/02* (2013.01); *B01D 3/10* (2013.01); *B01D 5/006* (2013.01); *B01D 5/0006* (2013.01)

(58) Field of Classification Search
CPC . B01D 3/02; B01D 3/08; B01D 3/085; B01D 3/10; B01D 5/0006; B01D 5/0041; B01D 5/006

See application file for complete search history.

(56) References Cited

U.S. PATENT DOCUMENTS 1,738,953 A 12/1929 Jensen
D83,687 S 3/1931 Macready
(Continued)

FOREIGN PATENT DOCUMENTS

CH 655014 A5 3/1986
CN 2134226 Y 5/1993
(Continued)

OTHER PUBLICATIONS

Translation of Hauser et al., WO 2013/050092 A1, published Apr. 11, 2013.*
(Continued)

*Primary Examiner* — Brian A McCaig
(74) *Attorney, Agent, or Firm* — KDW Firm PLLC

(57) ABSTRACT

Provided herein are integrated distillation apparatuses configured as stand-alone fully integrated systems having a reduced footprint. Integrated distillation apparatuses can have a rotary evaporator, a condenser, and an integrated refrigeration system or chiller, as well as an integrated water bath and vacuum pump, all of which can be integrated into a central frame and/or housing assembly. Integrated distillation apparatuses can be configured such that the rotary evaporator is movably attached to a frame structure and configured to be vertically translatable in position, whereas the condenser can be affixed to the structure by an arm extending from the structure and adjacent to the rotary evaporator, and wherein the refrigeration system can be in fluid communication with the condenser.

19 Claims, 10 Drawing Sheets

Related U.S. Application Data continuation of application No. 15/322,943, filed as application No. PCT/US2015/062615 on Nov. 25, 2015, now Pat. No. 10,307,688.

(60) Provisional application No. 62/109,993, filed on Jan. 30, 2015, provisional application No. 62/084,097, filed on Nov. 25, 2014.

(51) Int. Cl.
  *B01D 3/02* (2006.01)
  *B01D 3/10* (2006.01)
  *B01D 1/00* (2006.01)

(56) References Cited

U.S. PATENT DOCUMENTS

| | | |
|---|---|---|
| D105,266 S | 7/1937 | Cranston, Jr. |
| 2,128,784 A | 8/1938 | Tull et al. |
| 2,566,865 A | 9/1951 | Wingerter |
| D218,069 S | 7/1970 | Cornelius et al. |
| 4,239,484 A | 12/1980 | Schuster |
| D261,890 S | 11/1981 | Caspersen |
| D265,653 S | 8/1982 | Arzberger et al. |
| 4,370,046 A | 1/1983 | Van Bouwel et al. |
| D309,395 S | 7/1990 | Thompson et al. |
| D317,694 S | 6/1991 | Dust |
| D328,995 S | 9/1992 | Verheijen |
| D332,200 S | 1/1993 | Credle, Jr. |
| 5,181,559 A | 1/1993 | Svoboda |
| 5,211,808 A | 5/1993 | Vilardi et al. |
| D344,527 S | 2/1994 | Drago et al. |
| 5,340,444 A | 8/1994 | van der Heijden |
| D351,965 S | 11/1994 | Credle, Jr. |
| 5,365,750 A | 11/1994 | Greenthal |
| D358,290 S | 5/1995 | Schroeder |
| D365,962 S | 1/1996 | Amundsen et al. |
| D375,650 S | 11/1996 | Saito et al. |
| 5,584,187 A | 12/1996 | Whaley |
| 5,837,193 A | 11/1998 | Childers et al. |
| 5,916,351 A | 6/1999 | Sintchak |
| 5,919,339 A | 7/1999 | Ikeda |
| 5,937,662 A | 8/1999 | Schulak et al. |
| 6,461,287 B1 | 10/2002 | Glater |
| 6,658,875 B2 | 12/2003 | Weng |
| D503,785 S | 4/2005 | Otaki |
| D503,786 S | 4/2005 | Otaki |
| D503,971 S | 4/2005 | Otaki |
| D522,114 S | 5/2006 | Otaki |
| D600,492 S | 9/2009 | Hammad et al. |
| 7,713,421 B2 | 5/2010 | Galbraith |
| D669,154 S | 10/2012 | Choi |
| 9,005,403 B2 | 4/2015 | Adjabeng |
| D735,527 S | 8/2015 | Palermo et al. |
| D750,209 S | 2/2016 | Satou |
| D760,305 S | 6/2016 | Salin |
| D803,276 S | 11/2017 | Adjabeng et al. |
| 10,307,688 B2 | 6/2019 | Adjabeng |
| 10,898,828 B2 | 1/2021 | Adjabeng |
| 11,047,602 B2 | 6/2021 | Adjabeng et al. |
| 2009/0314324 A1 | 12/2009 | Murai et al. |
| 2011/0073459 A1 | 3/2011 | Adjabeng |
| 2013/0153397 A1 | 6/2013 | Carl et al. |
| 2014/0144767 A1 | 5/2014 | Jost et al. |
| 2016/0146519 A1 | 5/2016 | Ito |
| 2017/0252668 A1 | 9/2017 | Adjabeng |
| 2018/0209695 A1 | 7/2018 | Adjabeng et al. |
| 2019/0351348 A1 | 11/2019 | Adjabeng |
| 2022/0128271 A1 | 4/2022 | Adjabeng et al. |

FOREIGN PATENT DOCUMENTS

| | | | |
|---|---|---|---|
| CN | 101402900 A | 4/2009 | |
| CN | 103191795 A | 7/2013 | |
| CN | 103391800 A | 11/2013 | |
| CN | 203556155 U | 4/2014 | |
| CN | 103889528 A | 6/2014 | |
| CN | 203816660 U | 9/2014 | |
| CN | 204202354 U | 3/2015 | |
| CN | 106999793 B | 10/2020 | |
| DE | 3 248 501 A1 | 7/1984 | |
| DE | 3 726 669 A1 | 2/1989 | |
| DE | 4 231 458 A1 | 3/1994 | |
| DE | 203 00 046 U1 | 5/2003 | |
| EP | 2 810 566 A1 | 12/2014 | |
| EP | 3223926 A1 | 10/2017 | |
| EP | 3307411 | 4/2018 | |
| EP | 3223926 B1 | 9/2021 | |
| JP | S5813458 U | 1/1983 | |
| JP | S58132502 U | 9/1983 | |
| JP | S6451181 U | 3/1989 | |
| JP | H 09-168701 A | 6/1997 | |
| JP | H 09-209934 A | 8/1997 | |
| JP | 2000 279703 A | 10/2000 | |
| JP | 2009 106819 A | 5/2009 | |
| JP | 6633657 B2 | 1/2020 | |
| JP | 6759205 B2 | 9/2020 | |
| WO | WO 2005/113100 A1 | 12/2005 | |
| WO | WO 2013/050092 A1 * | 4/2013 | ............... B01D 3/08 |
| WO | WO 2016/086101 A1 | 6/2016 | |

OTHER PUBLICATIONS

Decision of Rejection corresponding to Chinese Patent Application No. 2016800339978 dated Oct. 25, 2021.

Decision to Grant corresponding to European Patent Application No. 15862685.3 dated Aug. 12, 2021.

Decision to Grant corresponding to Chinese Patent Application No. 201580064113.0 dated Jul. 30, 2020.

Decision to Grant corresponding to Japanese Patent Application No. 2017-528953 dated Aug. 4, 2020.

Notification of Correction to Decision to Grant corresponding to Chinese Patent Application No. 201580064113.0 dated Aug. 10, 2020.

Danfoss A/S, "Eliminator® filter drier: Why you need a filter drier in your system," Mar. 2013 [Retrieved from the Internet on Jan. 6, 2015] <URL:http://www.danfoss.com/NR/rdonlyres/F7D20FF8-CE64-48BC-9EFC-00C66A4901C2/0/FilterdrierinHVACRsystem.pdf>; p. 1.

Frank, P, "Schlenk Line Design and Safety," Apr. 4, 2011, Stanford University [Retrieved from the Internet on Jan. 6, 2015] <URL:http://operatingexperience.doe-hss.wikispaces.net/file/view/Schlenk+Line+Safety.pdf>; pp. 2-3.

International Search Report and Written Opinion for Application No. PCT/US15/62615 dated Feb. 5, 2016.

International Search Report and Written Opinion for Application No. PCT/US16/36886 dated Sep. 7, 2016.

KNF Neuberger Inc, "Rotary Evaporator RC 900" Sep. 2014 [Retrieved from the Internet on Jan. 6, 2015] <URL:http://www.knfusa.com/fileadmin/user_upload/PDF/US/Data_sheets/Updated_Datasheets/KNFUSA-Datasheet-RC900.pdf>; p. 2.

Restriction Requirement for U.S. Appl. No. 29/547,529 dated Mar. 10, 2017.

Notice of Allowance for U.S. Appl. No. 29/547,529 dated Jul. 31, 2017.

EcoChyll, Ecodyst, Inc., <https://www.youtube.com/watch?v=hTJxYVHyLOM>, 0:00-0:30, dated Jun. 27, 2016.

"EcoChyll is a Rotary Evaporator Accessory that Offers Superior Advantage," Ecodyst, <http://www.ecodyst.com/>, pp. 1, 3, retrieved on Jul. 14, 2017.

Reisch, M.S., "How One Entrepreneur Is Making Rotary Evaporators Cool Again," Chemical & Engineering News, vol. 94, Iss. 5, pp. 22-23, <http://cen.acs.org/articles/94/i5/One-Entrepreneur-Making-Rotary-Evaporators.html?h=684544369> dated Feb. 1, 2016.

Notice of Publication for European Application No. 15862685 dated Sep. 6, 2017.

Notice of Publication for European Application No. 16808371.5 dated Mar. 21, 2018.

(56) References Cited

OTHER PUBLICATIONS

Notice of Publication corresponding to U.S. Appl. No. 16/429,150 dated Nov. 21, 2019.
Extended European Search Report and Search Opinion for Application No. EP 15 86 2685 dated Jul. 3, 2018.
Non-Final Office Action for U.S. Appl. No. 15/322,943 dated Sep. 4, 2018.
Notice of Allowance for U.S. Appl. No. 15/322,943 dated Jan. 18, 2019.
Notice of Allowance for U.S. Appl. No. 16/429,150 dated Sep. 24, 2020.
Notice of Allowability for U.S. Appl. No. 16/429,150 dated Nov. 20, 2020.
Notice of Allowance for U.S. Appl. No. 15/573,042 dated Feb. 23, 2021.
Extended European Search Report with Supplementary European Search Report for European Patent Application No. 16808371.5 dated Jan. 28, 2019. [dated Feb. 5, 2019].
Office Action and Search Report corresponding to Chinese Patent Application No. 2015800641130 dated Jan. 28, 2019.
Office Action (Restriction Requirement) corresponding to U.S. Appl. No. 15/573,042 dated Jul. 22, 2019.
Notice of Reason for Refusal for Japanese Application No. 2017528953 dated Sep. 17, 2019.
Office Action corresponding to European Application No. 15862685.3 dated Apr. 8, 2019.
Office Action corresponding to Chinese Application No. 2016800339978 dated Sep. 6, 2019.
Office Action corresponding to Japanese Patent Application No. 2017564504 dated May 28, 2019.
Office Action (Decision to Grant) corresponding to Japanese Patent Application No. 2017564503 dated Nov. 12, 2019.
Office Action corresponding to Chinese Application No. 2015800641130 dated Sep. 29, 2019.
Office Action corresponding to European Application No. 16808371.5 dated Oct. 29, 2019.
Office Action corresponding to European Patent Application No. 15862685.3 dated Nov. 29, 2019.
Office Action corresponding to U.S. Appl. No. 15/573,042 dated Dec. 16, 2019.
Office Action corresponding to U.S. Appl. No. 16/429,150 dated Jan. 10, 2020.
Office Action corresponding to Chinese Patent Application No. 201680033997.8 dated May 12, 2020.
Office Action corresponding to U.S. Appl. No. 15/573,042 dated Aug. 10, 2020.
Office Action corresponding to Chinese Patent Application No. 201680033997.8 dated Jan. 15, 2021.
Oral Summons corresponding to European Patent Application No. 15862685.3 dated Jul. 30, 2020.
Chinese Office Action and Search Report Corresponding to Chinese Patent Application No. 202011084478.9 dated Oct. 15, 2021.
Office Action (Examiner's Report) corresponding to Canadian Patent Application No. 2,985,076 dated Apr. 6, 2022.
IPRP corresponding to International Application No. PCT/US2016/036886 dated Dec. 12, 2017.
Intent to Grant corresponding to European Patent Application No. 15862685.3-1101 dated May 25, 2021.
Office Action (Decision to Grant) corresponding to Japanese Patent Application No. 2017564504 dated Nov. 12, 2019.
Office Action corresponding to European Patent Application No. 16808371.5-1009 dated May 21, 2021.
Office Action corresponding to Canadian Patent Application No. 2,967,420 dated Jun. 14, 2021.
Office Action corresponding to Chinese Patent Application No. 201680033997.8 dated Jun. 2, 2021.
Office Action corresponding to Canadian Application No. 2,967,420 dated Feb. 9, 2022.
Office Action corresponding to U.S. Appl. No. 17/362,839 dated Jan. 4, 2023.
Notice of Allowance corresponding to Canadian Patent Application No. 2,985,076 dated Nov. 21, 2022.
Notice of Allowance corresponding to Canadian Patent Application No. 2,967,420 dated Oct. 28, 2022.
Office Action corresponding to Chinese Patent Application No. 202011084478.9 dated Aug. 26, 2022.
Office Action corresponding to European Patent Application No. 16808371.5-1016 dated Feb. 6, 2023.

* cited by examiner

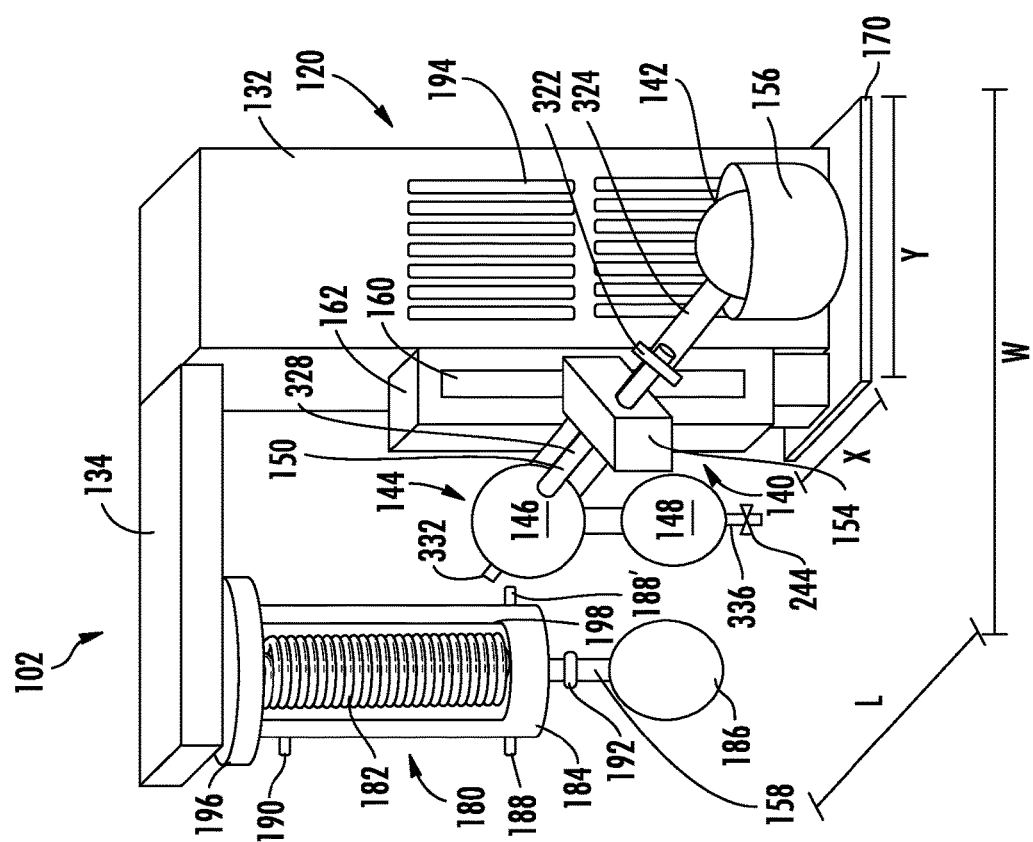
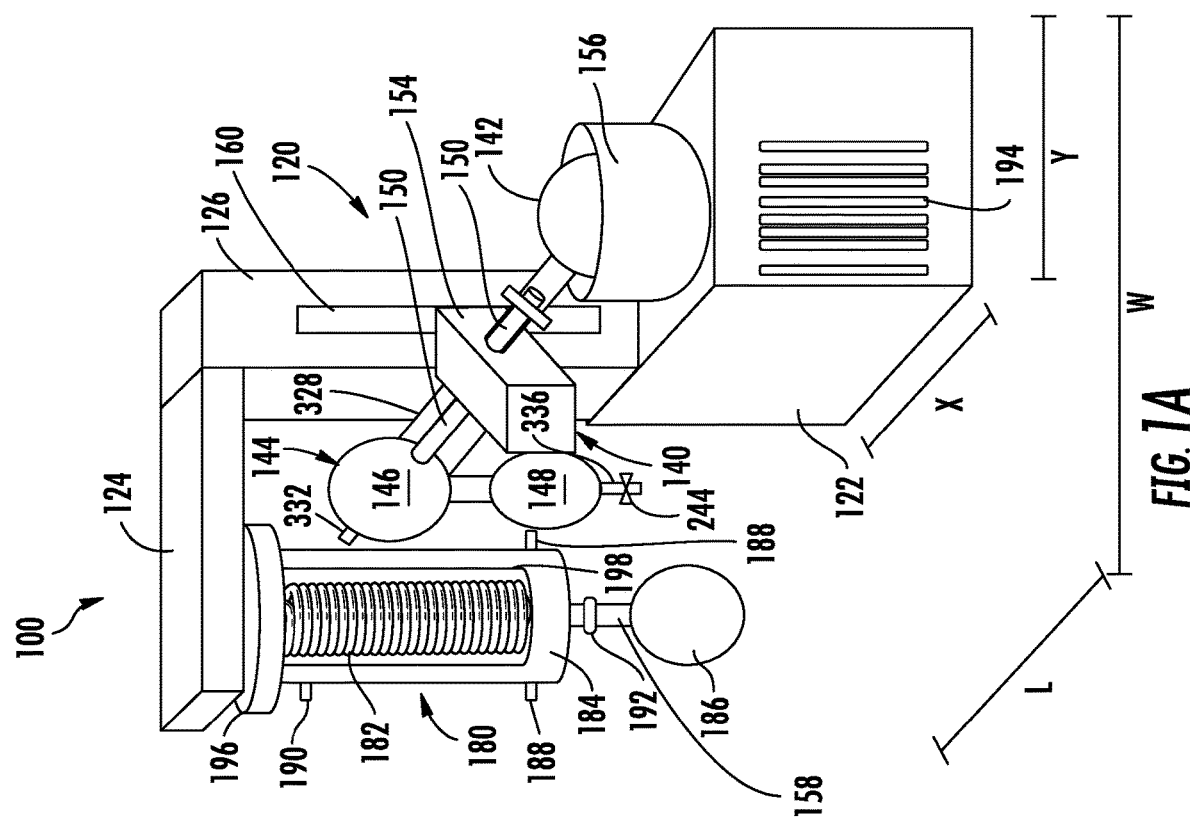
FIG. 1A
FIG. 1B

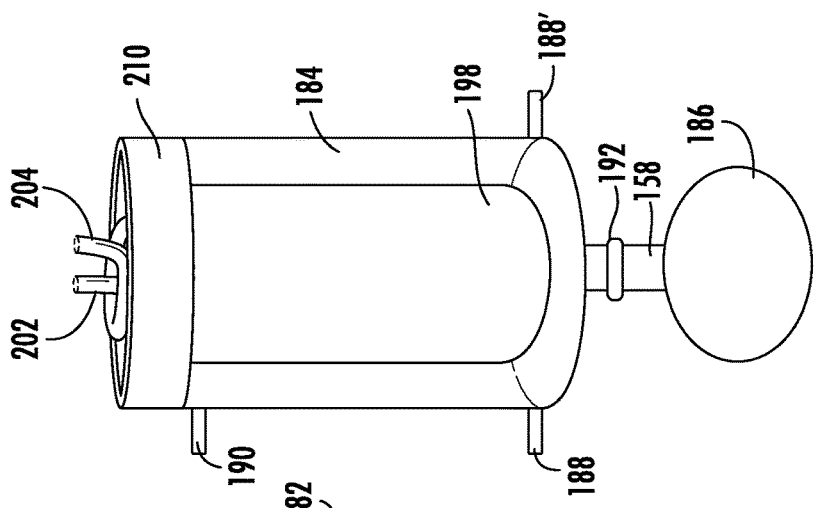
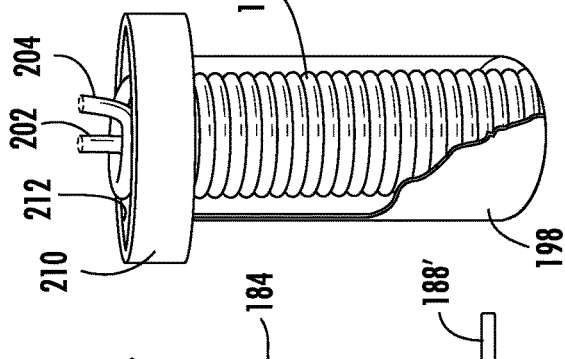
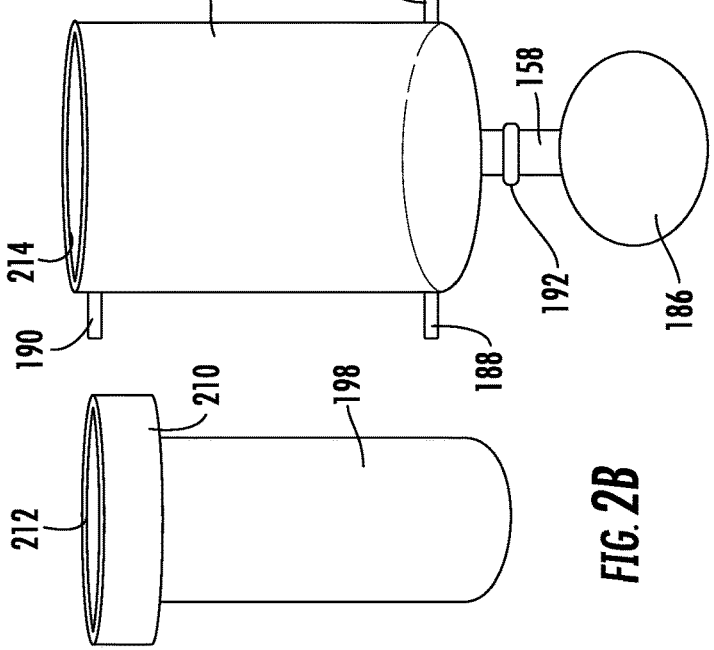
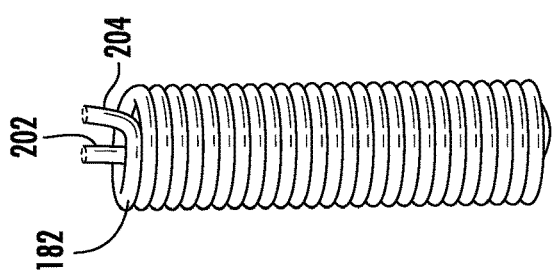
FIG. 2A  FIG. 2B  FIG. 2C  FIG. 2D  FIG. 2E

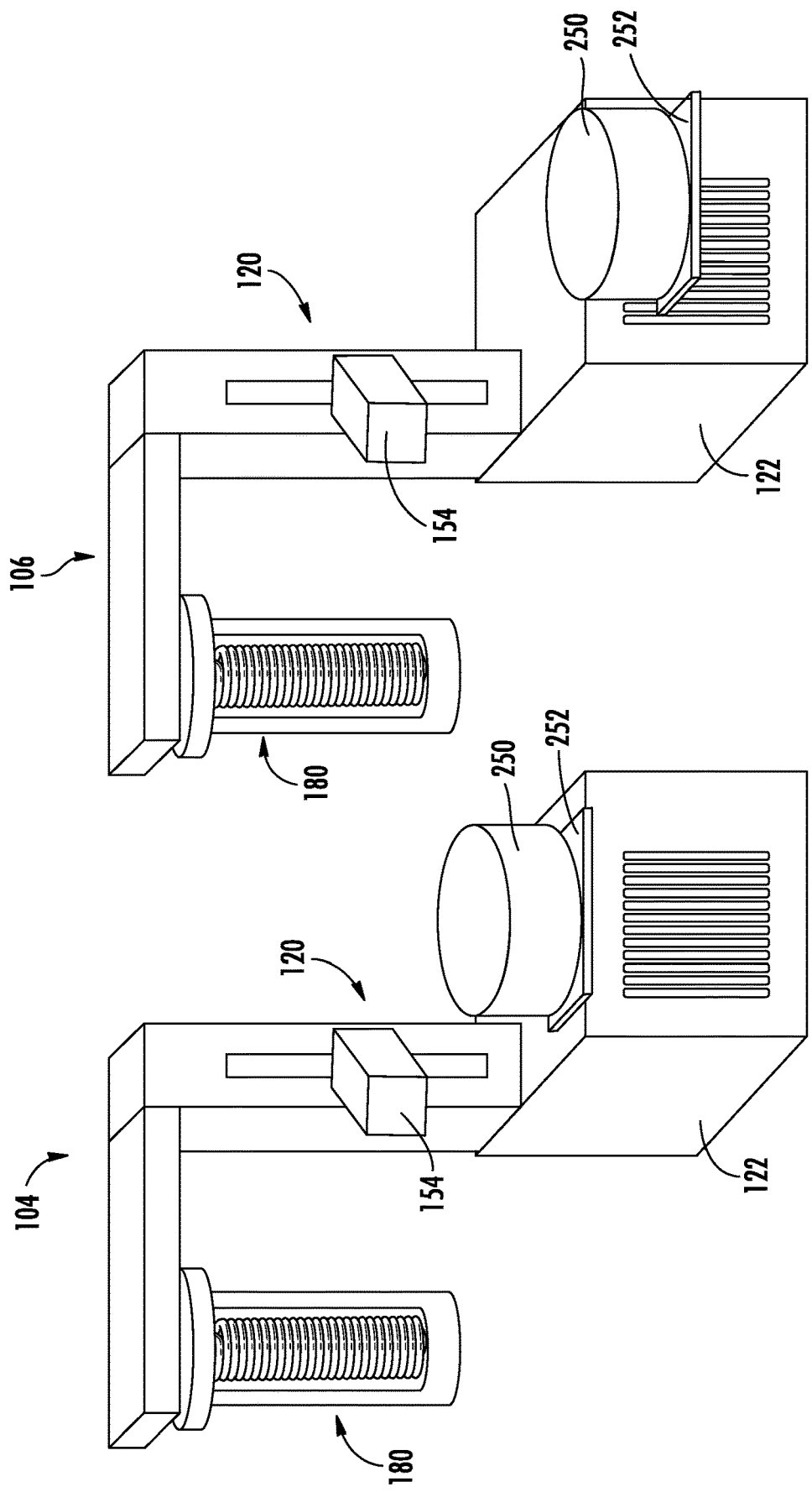

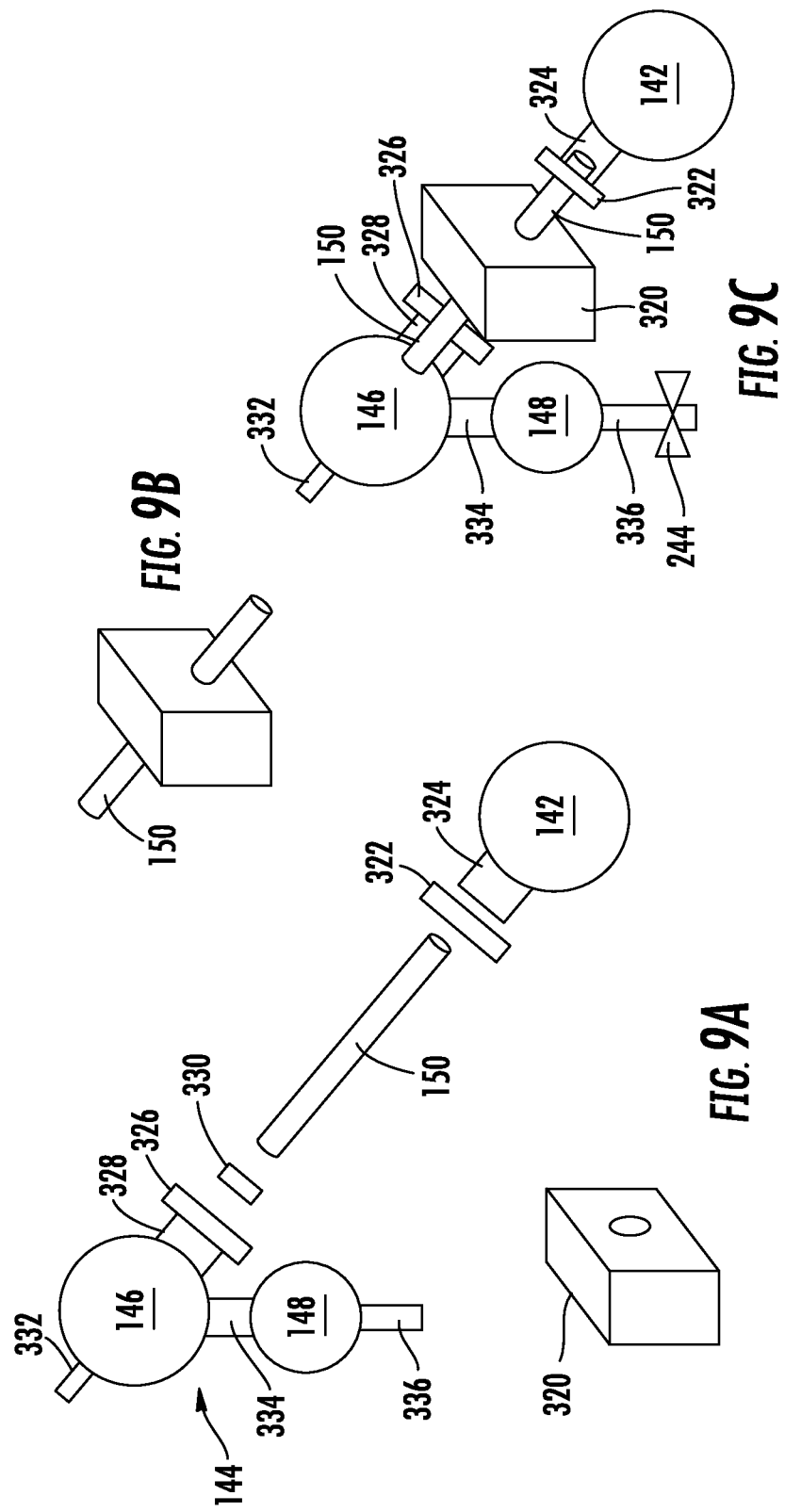

DISTILLATION AND ROTARY EVAPORATION APPARATUSES, DEVICES AND SYSTEMS

CROSS REFERENCE TO RELATED APPLICATIONS

This application is a continuation of U.S. patent application Ser. No. 16/429,150 filed on Jun. 3, 2019, which is a continuation of U.S. patent application Ser. No. 15/322,943 filed on Dec. 29, 2016, which is a 371 of International Application No. PCT/US2015/062615 filed on Nov. 25, 2015, which claims the benefit of and priority to U.S. Provisional Patent Application Ser. No. 62/084,097, filed Nov. 25, 2014, and the benefit of and priority to U.S. Provisional Patent Application Ser. No. 62/109,993, filed Jan. 30, 2015, the disclosures of which are incorporated herein by reference in their entireties.

TECHNICAL FIELD

The presently disclosed subject matter relates to distillation and rotary evaporation apparatuses, devices and systems. The presently disclosed subject matter also relates to the use of such distillation and rotary evaporation apparatuses, devices and systems.

BACKGROUND

Rotary evaporators, also referred to as distillers, are used in laboratories throughout the world, for removing solvents from organic and inorganic solutions, to yield a liquid or solid product. Generally, such evaporators or distillers work by evaporating a solvent and then condensing the evaporate into a collection vessel. Such evaporators, while functional, have limitations and inefficiencies that need to be addressed.

What are needed are rotary evaporator designs and systems that provide sufficient cooling and condensing capabilities that are cost effective and easy to use. Additionally, rotary evaporator designs that are fully integrated and easier to use are needed, particularly where improved yield and efficiencies can be realized. Additionally, rotary evaporator designs that are compact and have a small footprint are needed. Such advantages, and others disclosed herein, are provided by the instant disclosure.

SUMMARY

The presently disclosed subject matter provides integrated and stand-alone distillation and rotary evaporation apparatuses, devices and systems configured to operate efficiently while taking up less space. That is, distillation apparatus as provided herein can comprise a fully integrated unitary distillation apparatus and/or rotary evaporator configured with all components required for operation in a compact design, including in some embodiments integrated mechanical cooling/refrigeration systems.

An object of the presently disclosed subject matter having been stated hereinabove, and which is achieved in whole or in part by the presently disclosed subject matter, other objects will become evident as the description proceeds when taken in connection with the accompanying Examples as best described hereinbelow.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which:

FIGS. 1A and 1B are perspective views of two embodiments of distillation apparatuses as disclosed herein;

FIGS. 2A through 2E are schematic illustrations of components of a condenser configured to be used in the disclosed distillation apparatuses;

FIGS. 6A and 6B are perspective views of two embodiments of distillation apparatuses as disclosed herein;

FIGS. 9A through 9C are illustrations of a rotary evaporator assembly, including an exploded or component view (FIG. 9A), a partial assembled view (FIG. 9B), and fully assembled view (FIG. 9C)

DETAILED DESCRIPTION

Figure 3:
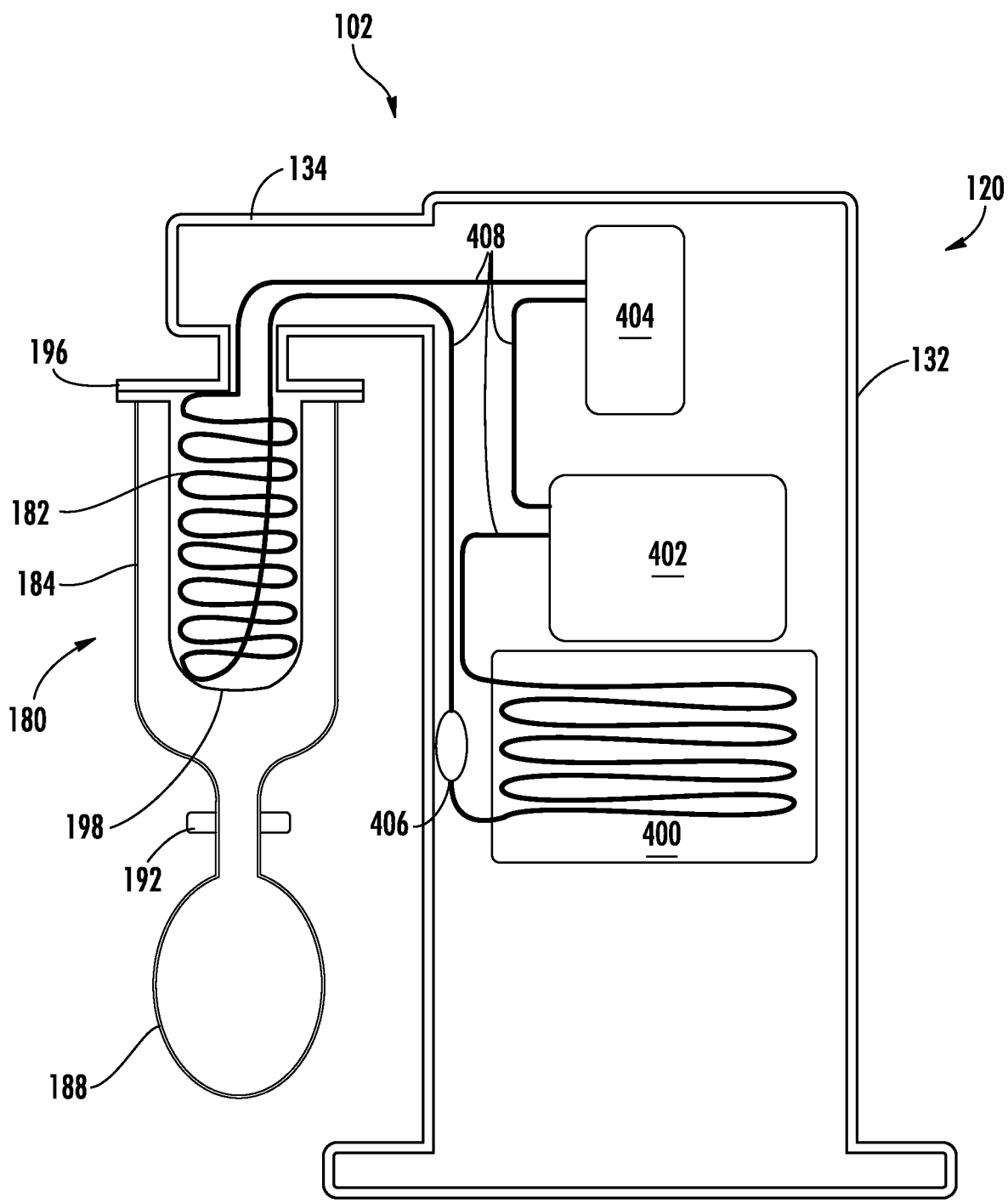
FIG. 3 is a cross-sectional view of a distillation apparatus as disclosed herein.

Rotary evaporators, also referred to in some embodiments as distillers or distillation apparatuses, are used in laboratories throughout the world, for removing solvents from organic and inorganic solutions, to yield a liquid or solid product. Generally, such evaporators or distillers work by placing a sample in a round-bottom flask (referred to as a sample flask or evaporation flask), typically a pear-shaped flask, which spins on an axis at an angle while sitting in a water bath. The flask is attached to a motor, which can include a rotary joint that enables the flask to spin, while permitting the evaporated solvent to flow through the joint (vapor duct) and come into contact with one or more condensers. The condenser(s) can cool the vapor, and the resulting cooled vapor (i.e., liquid) then flows down to a flask below the condenser (a collection flask), where it can be collected.

A water bath can typically be provided to supply sufficient heat to the flask to evaporate the solvent. Typically, the rotor, the motor, the rotary joint, the condenser, the flask used to hold the original solvent, and the flask used to hold the condensed vapor as it is collected, are all connected while the unit is in operation. A mechanical arm is usually provided to raise and lower the connected parts, to bring the flask out of the water bath.

The condenser of the rotary evaporator can be connected to a water source, and water is frequently acceptable to condense the solvent of interest, particularly if the solvent has a relatively high boiling point. Users frequently leave the water flowing through the condenser throughout the day, which results in large volumes of waste water. Further, where the solvent has a particularly low boiling point, it can be advantageous to cool the vapor to temperatures cooler than a water condenser can provide. To only use a water-cooled condenser might create an environmental issue, as a significant volume of volatile organic solvent would not be collected, and could instead enter into the environment.

Particularly when low boiling solvents are used, efforts have been made to improve on the condensation of the vapors so as to trap a significant portion of the solvents. In such cases, one approach is to use a dry-ice condenser, which is packed with dry ice, and, optionally, a solvent that forms a slurry with dry ice to maintain a given temperature (for example, dry ice-acetone maintains a temperature of −78° C.). However, since glass is a poor conductor of heat, the "cold finger" glass of the dry-ice condenser provides warmer than −78° C. cooling surface on which vapors are condensed. Also, in normal laboratory operating temperatures (ambient) dry ice evaporates very fast, which requires constant or frequent replenishing of dry ice in the dry-ice condenser. This is costly, burdensome and negatively impacts productivity.

Provided herein are distillation apparatuses, also referred to as rotary evaporators, rotary distillers, distillers, evaporators, and the like. More particularly, provided herein are distillation apparatuses configured as all-in-one or stand alone distillation apparatus, and configured in a compact design. That is, a distillation apparatus as provided herein can comprise a fully integrated unitary distillation apparatus and/or rotary evaporator configured with all components required for operation in a compact design.

Distillation apparatuses provided herein can in some embodiments comprise integrated cooling systems, such as for example a refrigerated condensing unit. Thus, in some embodiments disclosed rotary evaporators and/or distillation apparatuses can be capable of cooling evaporated solvents without using a dry ice trap, a continuous flow of water, and/or a recirculating chiller. By using a mechanically refrigerated cooling/freezing system, or chiller, to provide a cool reservoir capable of condensing vapors arising from solvent evaporation the waste of a continuous flow of water can be avoided, and the use of dry ice and compatible solvents such as acetone and isopropyl alcohol can be avoided, both of which provide for a more environmentally friendly alternative to existing rotary evaporators. Moreover, the configuration and design of the disclosed rotary evaporator and/or distillation apparatuses provides for the use of refrigeration cooling/heat exchange system in an integrated and compact design, particularly as compared to existing evaporators that comprise multiple components and require substantially more space to operate.

A rotary evaporator can in some aspects comprise a sample container, such as a sample flask, which is rotated integrally with a rotary joint. The sample flask can be soaked within a water bath, in some embodiments a heated water bath. The sample flask can be connected to one end of the rotary joint through a vapor duct that can be insertedly supported by a rotor of a motor through a sleeve. On the other side of the rotary joint there can in some embodiments be one or more condensers connected by a vapor duct to receive and thereby condense vapors evaporated from the sample flask.

In some embodiments a main body of the motor can be structured by a stator and a motor housing. As the motor is engaged, for example by supplying a current to the motor, a rotational force can be applied to the sample flask within the water bath through the rotary joint. In some embodiments the rotary joint can be insertedly supported by the sleeve in an insertion area. The sleeve can be fixed in engagement with the motor rotor. Furthermore, the sleeve can be rotatably supported by the motor main body at both ends thereof by bearings or the like. In some aspects a fastening member can be arranged within the sleeve for engaging and fastening the rotary joint (vapor duct) to the sleeve. The fastening member can comprise a fastening cap engaged with the sleeve. In some aspects the a coupling member can comprise a plurality of bushes slidably mounted on the outer peripheral surface of the rotary joint and an elastically deformable O-ring disposed between the bushes so that the O-ring can be pressured by the fastening force through the bushes such that the O-rings can be tightly contacted to the outer peripheral surface of the rotary joint and to the inner surface of the sleeve by elastic deformation. An air tight seal can be created at the junction of the rotary joint and rotational motor.

The rotation of the motor rotor can be transmitted to the rotary joint to rotate the rotary joint and thereby rotate the sample container or sample flask. Where the sample flask is at least partially submerged within the water heated water bath the sample can be evaporated and steam or vapor generated within the sample container. This evaporate can then pass through the rotary joint (vapor duct) and to the condenser.

Once at the condenser the evaporate or vapor can come into contact with a cooled surface, such as for example a heat exchanger, to thereby cause the evaporate or vapor to cool and condense into a liquid. Once in liquid form the condensed sample drips or falls by way of gravity into a collection flask positioned below the condenser. In some aspects the condenser can comprise a joint or other conduit to connect the condenser to a collection flask. The condenser can in some embodiments also comprise a port, tube or hose configured to connect the condenser to a vacuum line, such that the sample or solvent of interest can be evaporated under vacuum. The vacuum can in some embodiments be applied near the top of the condenser to provide the maximum opportunity for the vapor to be cooled, thus minimizing the opportunity that solvent vapors will pass on to the vacuum system, such as to the vacuum pump or vacuum trap.

In some embodiments, the distillation apparatus comprises a chiller mechanically connected to a condenser comprising a heat exchanger. The chiller can comprise a refrigeration system, including refrigeration lines, such as copper lines, through which refrigerant can pass, and a receiving tank, compressor, refrigeration condenser and dryer. The refrigeration lines can be connected to a heat exchanger in the condenser unit that cools the evaporate. In some embodiments a cooling coil, which can be exposed, or in some embodiments concealed in a chemically-resistant vapor trap or sleeve made of titanium (including commercial pure grade titanium), stainless steel, metal alloys, plastic, glass, rubber, such as neoprene rubber, and/or combinations thereof, can be fluidly connected to the refrigeration lines. In some embodiments titanium is used in the sleeve due to its robust chemical resistance. The condenser unit in some embodiments can comprise a cooling coil chamber that is cooled by direct expansion of refrigerant in the refrigeration lines. In some embodiments, the heat exchanger can comprise a copper coil through which cooled refrigerant passes, and which is encased in a titanium sleeve. In some embodiments, the heat exchanger can comprise a coil that is double looped and not encased in a sleeve such that vapors are exposed to an increase surface area on the cooled coils. In such embodiments the double coils can comprise stainless steel, titanium, and/or a combination thereof. In some embodiments, the chiller, including mechanical refrigeration system, can be mechanically linked to and fixed with the heat exchanger/condenser such that the two are provided in a single unitary device.

In some embodiments a distillation apparatus as disclosed herein can comprise a mounting arm configured to hold and position a rotary evaporator assembly such that the rotary evaporator assembly is an integrated component of the distillation apparatus along with the chiller and condenser. Such a mounting arm can comprise a rotor, motor, and/or rotary joint configured to rotatably support and engage a vapor tube, with a sample flask at one end. The opposing end of the vapor tube can engage a dummy condenser or cooling condenser unit. In some aspects the mounting arm is configured to support and facilitate the operation and functionality of the rotary evaporator assembly and integrate it into the unitary distillation apparatus. In some embodiments the mounting arm is mechanically linked to a main frame of the distillation apparatus, including in some embodiments a vertically adjustable member that is configured to allow the mounting arm, and attached rotary evaporator assembly, to raise and lower vertically as need to optimally position the sample flask in a water bath. In some embodiments the vertically adjustable member comprises a motorized member configured to move the mounting arm along a track or other guiding component to thereby raise and lower the mounting arm. The track or guiding component can in some embodiments be integrated into a portion of the main frame or housing of the chiller.

In one embodiment, a distillation apparatus as disclosed herein can further comprise an adjustable platform underneath and/or integrated into the water bath to raise and lower the bath relative to the collection flask. In some aspects the adjustable water bath can be motorized such that the vertical and/or horizontal positioning of the water bath can be adjusted. Thus, in some embodiments where the positioning of the water bath is adjustable the rotary evaporator itself, and the condenser attached to the rotary evaporator, can remain in a fixed position. In some aspects the water bath can weigh significantly less than the remainder of the device, such that moving the water bath is easier than raising and lowering the rotary evaporator.

Thus, in some embodiments an integrated distillation apparatus is provided herein, comprising a rotary evaporator configured to evaporate a sample, a condenser configured to condense an evaporated sample, a refrigeration system configured to cool the condenser, a collection vessel configured to collect a condensate, and a vacuum pump configured to create a vacuum in the evaporator, wherein each of the components is integrated into a single apparatus. Moreover, in some embodiments, the integrated distillation apparatus can further comprise a motorized component configured to provide a rotational force, a rotary joint insertedly supported within the motorized component upon which the rotational force is applied, a sample container connected to a first end of the rotary joint, a water bath into which the sample container can be placed, wherein the water bath is configured to provide heat energy to the sample container, a condenser connected to a second end of the rotary joint, wherein the condenser is configured to receive a collection flask that receives condensed vapors condensed off of the condenser, and a cooling coil configured to engage the condenser, wherein the cooling coil is configured to receive coolant from the refrigeration system, whereby the condenser is sufficiently cool to condense vapors coming into contact with the condenser. In some embodiments an integrated distillation apparatus as disclosed herein can further comprise a mechanical linkage configured to move the water bath in a vertical and/or horizontal direction to engage the sample container.

In some embodiments the refrigeration system can comprise a condenser and refrigerant, wherein the refrigeration system provides coolant to the condenser to thereby condense vapors from the evaporator. In some embodiments the coolant is provided to a double coil inside the condenser, wherein the vapors come into contact with the double cool or a wall surrounding the double coil. The refrigeration system can be configured to cool the condenser from about ambient temperature to about −100° C.

In some embodiments an integrated distillation apparatus as disclosed herein can further comprise a frame configured to integrate all components into a single apparatus, wherein the water bath is configured to move relative to the rotary evaporator, wherein the rotary evaporator, refrigeration system, collection vessel, condenser and vacuum pump are stationary within the frame. The collection vessel can comprise a first and second compartment divided by a vacuum valve, wherein the first compartment can be removed to collect the condensate while the vacuum valve preserves the vacuum on the evaporator and the second compartment continues to collect condensate. The condenser can comprise two or more condensers in a series.

In some embodiments an integrated distillation apparatus as disclosed herein can further comprise a vacuum seal inside the condenser. The vacuum seal inside the condenser can comprise an O-ring incorporated inside the condenser at a point where the rotary evaporator engages the condenser. The O-ring can provide an internal vacuum seal.

In some embodiments an integrated distillation apparatus as disclosed herein can further comprise a collapsible member disposed between the condenser and rotary evaporator, whereby the collapsible member is configured to allow an adjustment in the positioning of the rotary evaporator while connected to the condenser.

In some embodiments an integrated distillation apparatus as disclosed herein can further comprise a frame structure configured to house the refrigeration system and vacuum pump, and structurally support the rotary evaporator and condenser. The frame structure can be configured to support the condenser in a fixed position while supporting the rotary evaporator in a movable position.

In some embodiments provided herein is an integrated distillation apparatus comprising a rotary evaporator configured to evaporate a sample, a condenser configured to condense an evaporated sample, and a refrigeration system configured to cool the condenser, wherein the rotary evaporator, condenser and refrigeration system are integrated into a single structure, wherein the rotary evaporator is movably attached to the structure and configured to be vertically translatable in position, wherein the condenser is affixed to the structure by an arm extending from the structure and adjacent to the rotary evaporator, and wherein the refrigeration system is in fluid communication with the condenser. In some embodiments an integrated distillation apparatus as disclosed herein can further comprise a motorized component configured to provide a rotational force to the rotary evaporator. In some embodiments an integrated distillation apparatus as disclosed herein can further comprise a mechanical linkage to vertically translate the position of the rotary evaporator. In some embodiments an integrated distillation apparatus as disclosed herein can further comprise a heated water bath into which a sample container of the rotary evaporator can be submerged.

In some embodiments the condenser can comprise a cooling coil in fluid communication with the refrigeration system. The condenser can comprise a titanium sleeve surrounding the cooling coil, whereby the titanium sleeve is cooled by the cooling coil, wherein an evaporate from the rotary evaporator comes into contact with the titanium sleeve and condenses. The condenser can comprise metal alloy sleeve surrounding the cooling coil, whereby the metal alloy sleeve is cooled by the cooling coil, wherein an evaporate from the rotary evaporator comes into contact with the metal alloy sleeve and condenses.

Turning now to the figures, two embodiments of an integrated all-in-one distillation apparatus as provided herein are illustrated in FIGS. 1A and 1B. As depicted in FIGS. 1A and 1B, fully integrated all-in-one distillation apparatus 100 and 102, respectively, can comprise a chiller 120, a rotary evaporator assembly 140 and a condenser 180. In some embodiments, and as shown in FIGS. 1A and 1B, the chiller 120, rotary evaporator assembly 140, and a condenser 180, can be integrated into a single device or apparatus that is configured to compactly arrange the elements in such a way that provides for an effective and efficient distillation system while minimizing the operational area and/or footprint. For example, the footprint or operational area of distillation apparatus 100 and 102 can be defined by the length L, width W, and/or combination thereof (area in square inches for example) of the outer dimensions of the apparatus. Alternatively, or in addition, the footprint or operational area of distillation apparatus 100 and 102 can be defined by the length X, width Y, and/or combination thereof (area in square inches for example) of the dimensions of the base or platform of the housing/frame.

Continuing with FIG. 1A, distillation apparatus 100 can comprise a chiller 120. Chiller 120 can comprise in some embodiments a lower housing 122 and upper housing 126, with upper housing 126 extending substantially vertically from lower housing 122. In some embodiments chiller 120 can comprise a condenser arm 124 extending substantially horizontally from upper housing 126 and configured to support and mechanically connect condenser 180 to chiller 120. Chiller 120 can comprise an integrated refrigeration system (see FIG. 3) housed within lower housing 122 and upper housing 126, and continuing through condenser arm 124 to provide a cooled refrigerant to cool condenser 180. In some embodiments, lower housing 122 can house components of a refrigeration system (solely or in conjunction with upper housing 126), such as for example a receiving tank, compressor, refrigeration condenser and dryer (see FIG. 3), all or some of which can bee connected by refrigeration lines (copper tubing) to condenser 180 by feeding through upper housing 126 and condenser arm 124. In some embodiments lower housing 122 can comprise ventilation grates 194 configured to allow airflow into housing 122 and around the refrigeration system housed therein.

Mounting arm 154 can be mechanically linked to and can extend (substantially horizontally in some embodiments) from upper housing 126. Mounting arm 154 can be configured to support, hold and/or position rotary evaporator assembly 140 such that rotary evaporator assembly 140 is an integrated component, or can become an integrated component by mounting to mounting arm 154, of distillation apparatus 100, along with chiller 120 and condenser 180. In some embodiments mounting arm 154 can be mechanically linked to upper housing 126 by a vertically adjustable member 160 that is configured to allow mounting arm 154, and attached rotary evaporator assembly 140, to raise and lower vertically as need to optimally position the sample flask in a water bath. In some embodiments vertically adjustable member 160 can comprise a motorized member configured to move mounting arm 154 along a track or other guiding component to thereby raise and lower mounting arm 154. The track or guiding component of vertically adjustable member 160 can in some embodiments be integrated into a portion of the main frame or housing of the chiller, such as for example upper housing 126.

Rotary evaporator assembly 140 can comprise a rotary joint (vapor duct) 150 with a sample flask 142 at one end, whereby sample flask 142 can be rotated integrally with rotary joint 150. Sample flask 142 can be soaked, bathed or immersed within water bath 156, in some embodiments a heated water bath to cause evaporation of the sample or solvent in sample flask 142. Water bath 156 can comprise a heating element and controller or other configuration for heating water or other liquid/fluid contained therein. Sample flask 142 can be connected to one end of rotary joint 150 through opening 324 (and in some embodiments secured by clip 322), wherein the vapor duct can be insertedly supported by a rotor of a motor through a sleeve housed within mounting arm 154. Vapor duct/rotary joint 150 can act both as the axis for sample rotation, and as vacuum-tight conduit for the vapor being drawn off of the sample. On the other side of rotary joint 150 there can in some embodiments be one or more condensers (condenser 180 and/or dummy condenser 144) connected by vapor duct 150 to receive and thereby condense vapors evaporated from sample flask 142. In some embodiments dummy condenser 144 can be used, and can comprise an upper portion 146 and lower portion 148, as well as a connector arm 328 secured to mounting arm 154 and through which rotary joint 150 passes into upper portion 146.

Continuing with FIG. 1A, an evaporating (sample) flask 142 can be immersed in a water bath 156. Evaporating flask 142 can be rotated using a motor housed in mounting arm 154, with the rotational force provided by the motor being transferred to evaporating flask 142 by rotary joint (vapor duct) 150. Rotary joint 150 can pass/continue through mounting arm 154. Rotary joint 150 provides a conduit through which the evaporate (vapor) from a sample or solvent in evaporation flask 142 can pass into a condenser 180 attached to or in communication with vapor duct 150.

Once in condenser 180 vapors can be cooled thereby causing them to re-condense and drop into collection flask 186 by way of conduit 158. Collection flask 186 can in some embodiments be removed by a releasable joint 192, which can in some embodiments comprise a valve to maintain the vacuum in condenser 180 and/or rotary evaporator 140 until collection flask 186 is reattached. After the solvent has been removed (by evaporation), evaporating flask 142 can be removed from water bath 156 by raising mounting arm 154 by way of vertically adjustable member 160, which in some embodiments can comprise a track and motor or other mechanized unit.

Continuing with FIG. 1A, water bath 156 can be arranged on top of lower housing 122 and adjacent to upper housing 126. Such a configuration can minimize the footprint of distillation apparatus 100, particularly as compared to a distillation system where a water bath is not integrated and is instead placed or arranged on a surface adjacent to the distillation apparatus. Moreover, mounting arm 154 arranged on upper housing 126 and being vertically adjustable allows for rotary evaporating assembly 140 to be raised and lowered such that sample flask 142 can be placed into or removed from water bath 156 without having to move water bath 156. By vertically orienting these components the overall footprint of the all-in-one integrated distillation apparatus 100 is greatly reduced, particularly as compared to non-integrated systems.

Condenser 180 can be attached to condenser arm 124 by clamp 196, or other attachment mechanism, e.g. threads, screws, bolts, pressure fitting, etc. Condenser 180 can comprise condenser coil 182, condenser sleeve 198 and condenser housing 184. Condenser coil 182 can be configured to fit or slide inside condenser sleeve 198 to form a heat exchanger or "cold finger". Condenser coil 182 can in some embodiments be double looped to increase the surface area for cooling and heat exchange. Condenser coil 182 can be fluidly connected to the integrated refrigeration system in chiller 120 such that cooled refrigerant passing through condenser coil 182 causes a cooling effect on condenser sleeve 198. Evaporate or vapor from rotary evaporator 140 entering condenser housing 184 can come into contact with the cold surface of condenser sleeve 198 thereby causing the vapor to condense into a liquid to be collected in collection flask 186. The configuration of condenser 180 provides an efficient mechanism for trapping all or substantially all vapors and condensing them such that environmental impacts are lessened.

In some embodiments condenser coil 182 can comprise coiled copper line that forms a continuous loop thereby providing for a continuous flow of a refrigerant material or compound to flow from the heat exchanger in condenser 180 to the mechanical refrigeration system in chiller 120. While in some embodiments condenser coil 182 can be exposed for direct cooling of evaporate (vapor), as depicted in FIG. 1A it can be concealed by condenser sleeve 198 that can comprise a chemically-resistant vapor trap made of titanium (including commercial pure grade titanium), stainless steel, metal alloys, plastic, glass, rubber, such as neoprene rubber, and/or combinations thereof. In some embodiments, the heat exchanger can comprise a coil 182 that is double looped and not encased in a sleeve 198 such that vapors are exposed to an increased surface area on the cooled coils. In such embodiments the double coils can comprise stainless steel, titanium, and/or a combination thereof. As depicted in FIG. 1A, and in order to achieve a stand alone fully integrated system that minimizes space utilization, chiller 120, including mechanical refrigeration system, can be mechanically linked to and fixed with the heat exchanger/condenser 180 such that the two are provided in a single unitary device.

Condenser housing 184 can comprise a glass vessel enclosing the heat exchanger that includes condenser coil 182 and condenser sleeve 198. Condenser housing 184 can attach to condenser arm 124 by clamp 196 to create an air-tight seal. Condenser housing 184 can comprise an entry port 188 for receiving an evaporate or vapor from rotary evaporator assembly 140, and in some embodiments a second entry port 188'. A vacuum port 190 can in some embodiments be provided (in some cases near the top) and configured to receive a vacuum line from a vacuum pump to thereby cause a vacuum on the inner environment of condenser housing 184. In some embodiments a vacuum system, including vacuum pump and controller, can be provided in distillation apparatus 100, including for example in lower housing 120, to reduce the pressure within the evaporator system. An evaporate or vapor that comes into contact with heat exchanger 198 in condenser 180 and thereby condenses into a liquid can collect into collection flask 186 by passing through conduit 158. In some embodiments a joint 192 can be positioned on conduit 158 that can be configured to allow for removal of a collection flask (receiving flask) 186 without breaking a vacuum to the system during operation. Such joint 192 can comprise a valve to maintain the vacuum while removing collection flask 186.

Turning now to the FIG. 1B, distillation apparatus 102 can comprise a chiller 120. Chiller 120 can comprise in some embodiments a main housing 132, optionally supported on platform 170. In some embodiments chiller 120 can comprise a condenser arm 134 extending substantially horizontally from main housing 132, in some embodiments from an upper portion of main housing 132, and configured to support and mechanically connect condenser 180 to chiller 120. Chiller 120 can comprise an integrated refrigeration system (see FIG. 3) housed within main housing 132 and continuing through condenser arm 124 to provide a cooled refrigerant to cool condenser 180. In some embodiments, main housing 132 can house components of a refrigeration system (solely or in conjunction with condenser arm 134), such as for example a receiving tank, compressor, refrigeration condenser and dryer (see FIG. 3), all or some of which can bee connected by refrigeration lines (copper tubing) to condenser 180 by feeding through condenser arm 134. In some embodiments main housing 132 can comprise ventilation grates 194 configured to allow airflow into housing 132 and around the refrigeration system housed therein.

Mounting arm 154 can be mechanically linked to and can extend (substantially horizontally in some embodiments) from main housing 132. Mounting arm 154 can be configured to support, hold and/or position rotary evaporator assembly 140 such that rotary evaporator assembly 140 is an integrated component, or can become an integrated component by mounting to mounting arm 154, of distillation apparatus 102, along with chiller 120 and condenser 180. In some embodiments mounting arm 154 can be mechanically linked to main housing 132 by a vertically adjustable member 162 that is configured to allow mounting arm 154, and attached rotary evaporator assembly 140, to raise and lower vertically as need to optimally position the sample flask in a water bath. In some embodiments vertically adjustable member 162 can comprise a motorized member configured to move mounting arm 154 along track 160 or other guiding component to thereby raise and lower mounting arm 154. The track or guiding component of vertically adjustable member 162 can in some embodiments be integrated into a portion of the main frame or housing of the chiller, such as for example main housing 132.

Rotary evaporator assembly 140 can comprise a rotary joint (vapor duct) 150 with a sample flask 142 at one end, whereby sample flask 142 can be rotated integrally with rotary joint 150. Sample flask 142 can be soaked, bathed or immersed within water bath 156, in some embodiments a heated water bath to cause evaporation of the sample or solvent in sample flask 142. Water bath 156 can comprise a heating element and controller or other configuration for heating water or other liquid/fluid contained therein. Sample flask 142 can be connected to one end of rotary joint 150 through a vapor duct that can be insertedly supported by a rotor of a motor through a sleeve housed within mounting arm 154. Vapor duct/rotary joint 150 can act both as the axis for sample rotation, and as vacuum-tight conduit for the vapor being drawn off of the sample. On the other side of rotary joint 150 there can in some embodiments be one or more condensers (condenser 180 and/or dummy condenser 144) connected by vapor duct 150 to receive and thereby condense vapors evaporated from sample flask 142. In some embodiments dummy condenser 144 can be used, and can comprise an upper portion 146 and lower portion 148.

Continuing with FIG. 1B, an evaporating (sample) flask 142 can be immersed in a water bath 156. Evaporating flask 142 can be rotated using a motor housed in mounting arm 154, with the rotational force provided by the motor being transferred to evaporating flask 142 by rotary joint (vapor duct) 150. Rotary joint 150 can pass/continue through mounting arm 154.

Figure 4:
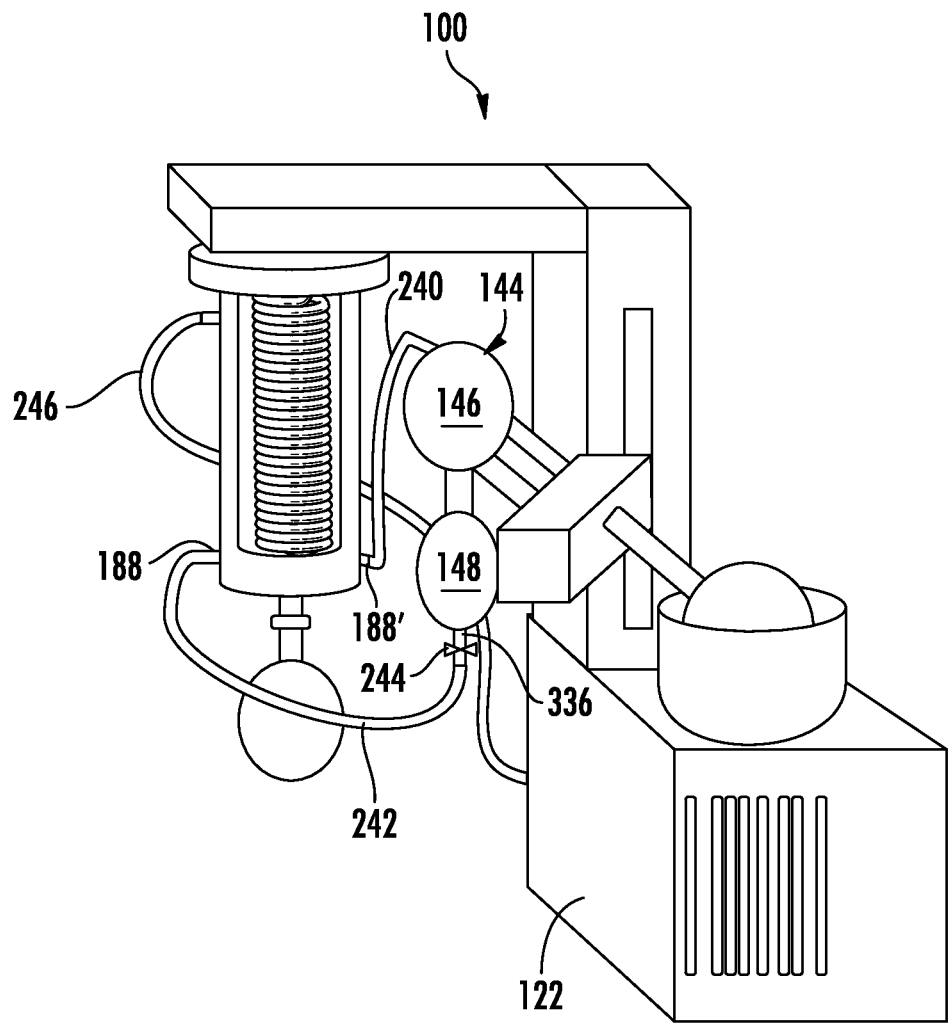
FIG. 4 is a perspective view of an embodiment of a distillation apparatus as disclosed herein.

Together, rotary joint (vapor duct) 150 can provide a conduit through which the evaporate (vapor) from a sample or solvent in evaporation flask 142 can pass into a condenser 180 attached to or in communication with vapor duct 150 (illustrated in FIG. 4). Once in condenser 180 vapors can be cooled thereby causing them to re-condense and drop into collection flask 186. After the solvent has been removed (by evaporation), evaporating flask 142 can be removed from water bath 156 by raising mounting arm 154 by way of vertically adjustable member 162, which in some embodiments can comprise a track and motor or other mechanized unit.

Continuing with FIG. 1B, water bath 156 can be arranged in front of main housing 132. Such a configuration can minimize the footprint of distillation apparatus 100, particularly as compared to a distillation system where a water bath is not integrated and is instead placed or arranged on a surface adjacent to the distillation apparatus. Moreover, mounting arm 154 arranged on main housing 132 and being vertically adjustable allows for rotary evaporating assembly 140 to be raised and lowered such that sample flask 142 can be placed into or removed from water bath 156 without having to move water bath 156. By vertically orienting these components the overall footprint of the all-in-one integrated distillation apparatus 102 is greatly reduced, particularly as compared to non-integrated systems.

Condenser 180 can be attached to condenser arm 134 by clamp 196, or other attachment mechanism, e.g. threads, screws, bolts, pressure fitting, etc. Condenser 180 is otherwise the same in the embodiment illustrated in FIG. 1B as in the embodiment illustrated in FIG. 1A.

FIGS. 2A through 2E illustrate the condenser apparatus that can in some embodiments be used in one or more embodiments of the disclosed distillation apparatuses. FIG. 2A depicts condenser coil 182, made from a copper tubing material in some embodiments, or alternatively stainless steel, other suitable metal alloys such as titanium. In some embodiments condenser coil 182 can comprise a titanium material with an inner coating of copper. Condenser coil 182 can have an incoming line 202 for receiving a flow of chilled coolant or refrigerant to pass through the coils, and an outgoing line 204 configured as a conduit for the outgoing coolant or refrigerant after having passed through the coils and acting as a heat exchanger. Incoming line 202 and outgoing line 204 are configured to be connected to the integrated refrigeration system of chiller 120. Condenser coil 182 can in some embodiments be double looped to increase the surface area for cooling and heat exchange.

FIG. 2B depicts condenser sleeve 198 that can comprise a chemically-resistant material such as but not limited to titanium (including commercial pure grade titanium), stainless steel, metal alloys, plastic, glass, rubber, such as neoprene rubber, and/or combinations thereof. In some embodiments titanium is used in the sleeve due to its robust chemical resistance. In some embodiments condenser sleeve 198 can comprise a titanium tubular structure with an enclosed lower end and open upper end 212, and having a diameter sufficient to receive or slidingly engage condenser coil 182 as depicted in FIG. 2D. Condenser sleeve 198 can comprise a collar 210 having a larger diameter than the tubular structure of condenser sleeve 198, and can in some embodiments be configured to mechanically engage, e.g. by threads, pins, slots, screws and/or other attachment/securement mechanisms to condenser arm 124, 134.

FIG. 2C illustrates an embodiment of a condenser housing 184, comprising in some embodiments a glass vessel configured to enclose or otherwise surround a heat exchanger that includes condenser coil 182 and condenser sleeve 198. Condenser housing 184 can attach to condenser arm 124, 134 by a clamp or other securing mechanism to create an air-tight seal, and in some embodiments can abut collar 210 of condenser sleeve 198. Condenser housing 184 can comprise a substantially cylindrical glass sleeve of a sufficient diameter to receive condenser sleeve 198 and/or condenser coil 182 in on upper open end 214.

Condenser housing 184 can comprise an entry port 188 for receiving an evaporate or vapor from rotary evaporator assembly, and in some embodiments a second entry port 188'. A vacuum port 190 can in some embodiments be provided (in some cases near the top) and configured to receive a vacuum line from a vacuum pump to thereby cause a vacuum on the inner environment of condenser housing 184. An evaporate or vapor that comes into contact with heat exchanger 198 in condenser 180 and thereby condenses into a liquid can collect into collection flask 186 by passing through conduit 158. In some embodiments a joint 192 can be positioned on conduit 158 that can be configured to allow for removal of a collection flask (receiving flask) 186 without breaking a vacuum to the system during operation. Such joint 192 can comprise a valve to maintain the vacuum while removing collection flask 186.

FIG. 2D illustrates a cut-away view of condenser sleeve 198 with condenser coil 182 residing therein to form a heat exchanger or "cold finger". Similarly, FIG. 2E illustrates condenser housing 184 with condenser sleeve 198 residing therein (note incoming line 202 and outgoing line 204 of condenser coil 182 extending above opening 212 of condenser sleeve 198 indicating the presence of condenser coil 182 inside condenser sleeve 198).

FIG. 3 is a cross-sectional view of an distillation apparatus as disclosed herein. For illustration purposes only FIG. 3 most closely resembles a cross-sectional view of the embodiment depicted in FIG. 1B, but the components of the refrigeration system and condenser system depicted in FIG. 3 is equally applicable to other embodiments and configurations. As illustrated in FIG. 3 distillation apparatus 102 can comprise chiller 120 and condenser 180 connected by condenser arm 134. Condenser coil 182 inside condenser sleeve 198 forms a continuous loop with the refrigeration system in chiller 120 by way of conduit 408. In some embodiment conduit 408 comprises a copper tubing that facilitates the fluid flow of a cooling agent or refrigerant compound through the refrigeration system, into condenser coil 182, together with condenser sleeve 198 acting as a heat exchanger, and back through the refrigeration system in a continuous loop. The refrigeration system can comprise a receiving tank 404, compressor 402, refrigeration condenser 400 and dryer 406. All, or substantially all, of the components of the refrigeration system can be housed inside main housing 132 of chiller 120.

FIG. 4 is a perspective view of a distillation apparatus with an integrated rotary evaporator assembly connected to a condenser. Particularly, distillation apparatus 100 is similar to that disclosed in FIG. 1A but with the addition of connections, e.g. tubing, between rotary evaporator assembly 140 condenser 180. In this embodiment dummy condenser 144 can be connected to condenser 180 by tubing 240, 242. Particularly, in some embodiments upper portion 146 can be connected to inlet 188' via outlet 332, while lower portion 148 can be connected to inlet 188 via outlet/conduit 336, or vice versa. In some embodiments lower portion 148 of dummy condenser 144 can comprise an outlet or port comprising a valve 244 that can be closed when not connected via tubing 242. Thus, in some embodiments only upper portion 146 can be connected to condenser 180 by tubing 240 at either inlet 188 or 188'. Alternatively, both tubing 240 and 242 can connect to a single inlet, either 188 or 188'.

Tubing 240 and 242 can be a flexible tubing material that allows rotary evaporator assembly 140 to be connected to condenser 180 all the while allowing for rotary evaporator assembly 140 to be moved up and down as needed to submerge or remove sample flask 142 in water bath 156 without having to disconnect condenser 180. By using dummy condenser 144 such a configuration allows for free movement and adjustment of rotary evaporator assembly 140 in the integrated distillation apparatus. Such advantages are not afforded by other systems.

Moreover, in some embodiments vacuum line 246 can connect a vacuum system or pump (not shown) to vacuum port 190. In some embodiments vacuum system or pump can be integrated within housing 122, for example, or can be a stand alone separate unit.

Figure 5:
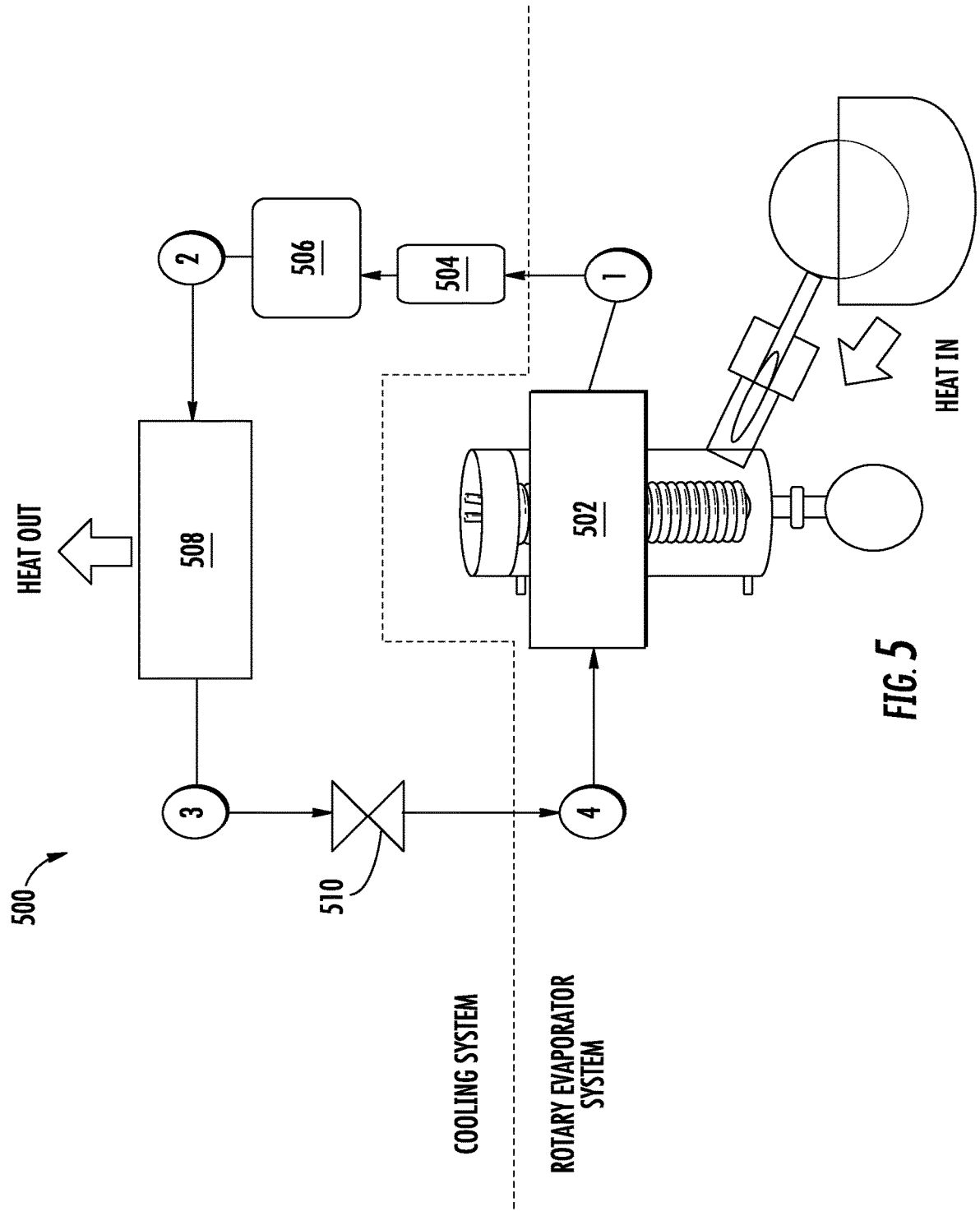
FIG. 5 is a schematic illustration of the operation of a distillation apparatus as disclosed herein.

FIG. 5 is a schematic 500 illustrating the flow or transfer of heat energy with a distillation apparatus as disclosed herein, including for example from a rotary evaporator assembly to a chiller or cooling system. In a first step 1 heat from a rotary evaporator assembly can be captured by a condenser/heat exchanger 502 and directed through a receiver tank 504 and compressor 506 via a refrigerant compound. In a second step 2 the heat can be removed from the refrigerant compound by refrigeration condenser 508. In a third step 3 the cooled refrigerant compound can pass through a dryer 510 and then in a fourth step 4 can be recirculated back to condenser/heat exchanger 502 to capture heat generated by the rotary evaporator. The integrated design of the disclosed distillation apparatuses provides for this efficient transfer of heat energy from the rotary evaporator system to the refrigeration system (cooling system) in a self-contained and compact system.

FIGS. 6A and 6B illustrate alternative embodiments of distillation apparatuses disclosed herein. Distillation apparatuses 104 and 106 are similar to distillation apparatus 100 illustrated in FIG. 1A, but with different configurations for water bath 250. Note that rotary evaporator assemblies are not shown in FIGS. 6A and 6B for simplicity, but can be attached and incorporated as described herein and shown in the figures, e.g. FIG. 1A.

In FIG. 6A water bath 250 is positioned on an upper side of lower housing 122 and resting on a platform 252. Platform 252 can be configured to move in a horizontal direction to translate the position of water bath 250 as needed to align with a rotary evaporator. Alternatively, or in addition, platform 252 can be configured to move in a vertical direction, and/or vertical and horizontal direction, to translate the position of water bath 250 as needed to align with a rotary evaporator.

In FIG. 6B water bath 250 is positioned in front of or on a front portion of lower housing 122 and resting on a platform 252. Platform 252 can be configured to move in a vertical direction to raise and lower the position of water bath 250 as needed to align with a rotary evaporator. Alternatively, or in addition, platform 252 can be configured to move in a horizontal direction, and/or vertical and horizontal direction, to translate the position of water bath 250 as needed to align with a rotary evaporator.

Figure 7A:
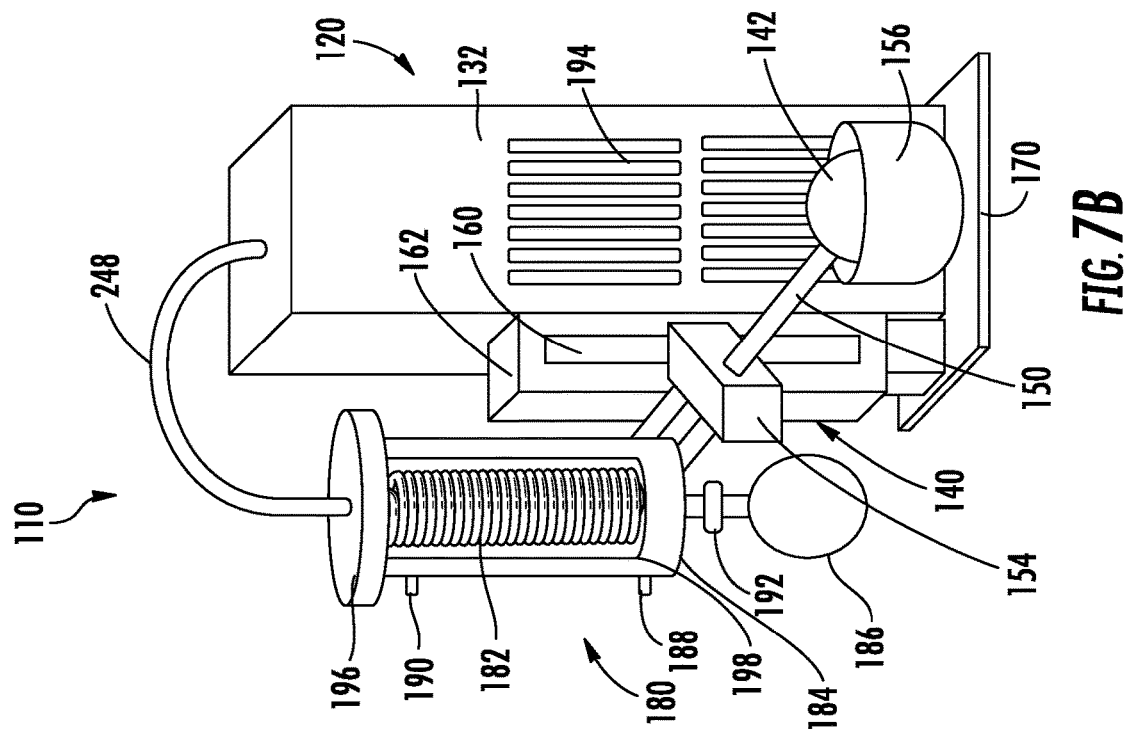
FIGS. 7A and 7B are perspective views of two embodiments of distillation apparatuses as disclosed herein.
Figure 7B:
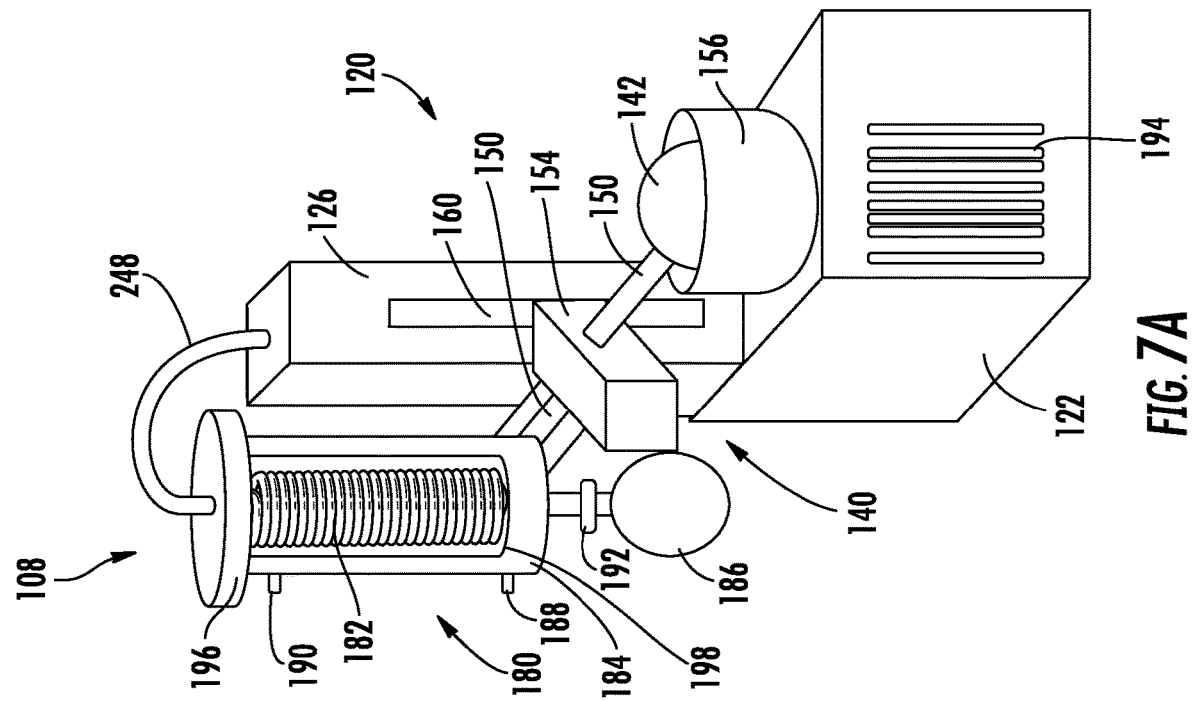

FIGS. 7A and 7B illustrate embodiments of distillation apparatuses disclosed herein. The distillation apparatuses 108 and 110 in FIGS. 7A and 7B, respectively, are analogous to distillation apparatuses 100 and 102, respectively, with exception to the fixed condenser arms and dummy condenser. In the designs illustrated in FIGS. 7A and 7B fixed condenser arms (see condenser arms 124 and 134 in FIGS. 1A and 1B, respectively) are replaced with flexible coolant lines 248. Moreover, no dummy condenser 144 is needed in the configurations illustrated in FIGS. 7A and 7B.

To elaborate, as depicted in FIGS. 7A and 7B, fully integrated all-in-one distillation apparatus 108 and 110, respectively, can comprise a chiller 120, a rotary evaporator assembly 140 and a condenser 180. In some embodiments, and as shown in FIGS. 1A and 1B, the chiller 120, rotary evaporator assembly 140, and a condenser 180, can be integrated into a single device or apparatus that is configured to compactly arrange the elements in such a way that provides for an effective and efficient distillation system while minimizing the operational area and/or footprint.

Continuing with FIG. 7A, distillation apparatus 100 can comprise a chiller 120. Chiller 120 can comprise in some embodiments a lower housing 122 and upper housing 126, with upper housing 126 extending substantially vertically from lower housing 122. In some embodiments chiller 120 can comprise a flexible coolant line 248 extending from upper housing 126 fluidly connecting condenser 180 to chiller 120. Chiller 120 can comprise an integrated refrigeration system (see FIG. 3) housed within lower housing 122 and upper housing 126, and continuing through flexible coolant line 248 to provide a cooled refrigerant to cool condenser 180. In some embodiments, lower housing 122 can house components of a refrigeration system (solely or in conjunction with upper housing 126), such as for example a receiving tank, compressor, refrigeration condenser and dryer (see FIG. 3), all or some of which can bee connected by refrigeration lines (copper tubing) to condenser 180 by feeding through upper housing 126 and flexible coolant line 248. In some embodiments lower housing 122 can comprise ventilation grates 194 configured to allow airflow into housing 122 and around the refrigeration system housed therein.

Mounting arm 154 can be mechanically linked to and can extend (substantially horizontally in some embodiments) from upper housing 126. Mounting arm 154 can be configured to support, hold and/or position rotary evaporator assembly 140 such that rotary evaporator assembly 140 is an integrated component, or can become an integrated component by mounting to mounting arm 154, of distillation apparatus 100, along with chiller 120 and condenser 180. In some embodiments mounting arm 154 can be mechanically linked to upper housing 126 by a vertically adjustable member 160 that is configured to allow mounting arm 154, and attached rotary evaporator assembly 140, to raise and lower vertically as need to optimally position the sample flask in a water bath. In some embodiments vertically adjustable member 160 can comprise a motorized member configured to move mounting arm 154 along a track or other guiding component to thereby raise and lower mounting arm 154. The track or guiding component of vertically adjustable member 160 can in some embodiments be integrated into a portion of the main frame or housing of the chiller, such as for example upper housing 126.

Rotary evaporator assembly 140 can comprise a rotary joint (vapor duct) 150 with a sample flask 142 at one end, whereby sample flask 142 can be rotated integrally with rotary joint 150. Sample flask 142 can be soaked, bathed or immersed within water bath 156, in some embodiments a heated water bath to cause evaporation of the sample or solvent in sample flask 142. Water bath 156 can comprise a heating element and controller or other configuration for heating water or other liquid/fluid contained therein. Sample flask 142 can be connected to one end of rotary joint 150 through a vapor duct that can be insertedly supported by a rotor of a motor through a sleeve housed within mounting arm 154. Vapor duct/rotary joint 150 can act both as the axis for sample rotation, and as vacuum-tight conduit for the vapor being drawn off of the sample. On the other side of rotary joint 150 there can in some embodiments condenser 180 connected by vapor duct 150 to receive and thereby condense vapors evaporated from sample flask 142.

Continuing with FIG. 7A, an evaporating (sample) flask 142 can be immersed in a water bath 156. Evaporating flask 142 can be rotated using a motor housed in mounting arm 154, with the rotational force provided by the motor being transferred to evaporating flask 142 by rotary joint (vapor duct) 150. Rotary joint 150 can pass/continue through mounting arm 154. Together, rotary joint 150 can provide a conduit through which the evaporate (vapor) from a sample or solvent in evaporation flask 142 can pass into a condenser 180 attached to or in communication with vapor duct 150. Once in condenser 180 vapors can be cooled thereby causing them to re-condense and drop into collection flask 186. After the solvent has been removed (by evaporation), evaporating flask 142 can be removed from water bath 156 by raising mounting arm 154 by way of vertically adjustable member 160, which in some embodiments can comprise a track and motor or other mechanized unit.

Continuing with FIG. 7A, water bath 156 can be arranged on top of lower housing 122 and adjacent to upper housing 126. Such a configuration can minimize the footprint of distillation apparatus 100, particularly as compared to a distillation system where a water bath is not integrated and is instead placed or arranged on a surface adjacent to the distillation apparatus. Moreover, mounting arm 154 arranged on upper housing 126 and being vertically adjustable allows for rotary evaporating assembly 140 to be raised and lowered such that sample flask 142 can be placed into or removed from water bath 156 without having to move water bath 156. By vertically orienting these components the overall footprint of the all-in-one integrated distillation apparatus 100 is greatly reduced, particularly as compared to non-integrated systems.

All components of condenser 180 can be similar to that already described with respect to FIG. 1A.

Turning now to the FIG. 7B, distillation apparatus 102 can comprise a chiller 120. Chiller 120 can comprise in some embodiments a main housing 132, optionally supported on platform 170. In some embodiments chiller 120 can comprise a flexible coolant line 248 extending from main housing 132 and configured to fluidly connect condenser 180 to chiller 120. Chiller 120 can comprise an integrated refrigeration system (see FIG. 3) housed within main housing 132 and continuing through flexible coolant line 248 to provide a cooled refrigerant to cool condenser 180. In some embodiments, main housing 132 can house components of a refrigeration system (solely or in conjunction with condenser arm 134), such as for example a receiving tank, compressor, refrigeration condenser and dryer (see FIG. 3), all or some of which can bee connected by refrigeration lines (copper tubing) to condenser 180 by feeding through flexible coolant line 248. In some embodiments main housing 132 can comprise ventilation grates 194 configured to allow airflow into housing 132 and around the refrigeration system housed therein.

Mounting arm 154 can be mechanically linked to and can extend (substantially horizontally in some embodiments) from main housing 132. Mounting arm 154 can be configured to support, hold and/or position rotary evaporator assembly 140 such that rotary evaporator assembly 140 is an integrated component, or can become an integrated component by mounting to mounting arm 154, of distillation apparatus 102, along with chiller 120 and condenser 180. In some embodiments mounting arm 154 can be mechanically linked to main housing 132 by a vertically adjustable member 162 that is configured to allow mounting arm 154, and attached rotary evaporator assembly 140, to raise and lower vertically as need to optimally position the sample flask in a water bath. In some embodiments vertically adjustable member 162 can comprise a motorized member configured to move mounting arm 154 along track 160 or other guiding component to thereby raise and lower mounting arm 154. The track or guiding component of vertically adjustable member 162 can in some embodiments be integrated into a portion of the main frame or housing of the chiller, such as for example main housing 132.

Rotary evaporator assembly 140 can comprise a rotary joint (vapor duct) 150 with a sample flask 142 at one end, whereby sample flask 142 can be rotated integrally with rotary joint 150. Sample flask 142 can be soaked, bathed or immersed within water bath 156, in some embodiments a heated water bath to cause evaporation of the sample or solvent in sample flask 142. Water bath 156 can comprise a heating element and controller or other configuration for heating water or other liquid/fluid contained therein. Sample flask 142 can be connected to one end of rotary joint 150 through a vapor duct that can be insertedly supported by a rotor of a motor through a sleeve housed within mounting arm 154. Vapor duct/rotary joint 150 can act both as the axis for sample rotation, and as vacuum-tight conduit for the vapor being drawn off of the sample. On the other side of rotary joint 150 there can in some embodiments be condenser 180 connected by vapor duct 150 to receive and thereby condense vapors evaporated from sample flask 142.

Continuing with FIG. 7B, an evaporating (sample) flask 142 can be immersed in a water bath 156. Evaporating flask 142 can be rotated using a motor housed in mounting arm 154, with the rotational force provided by the motor being transferred to evaporating flask 142 by rotary joint (vapor duct) 150. Rotary joint 150 can pass/continue through mounting arm 154. Together, rotary joint 150 can provide a conduit through which the evaporate (vapor) from a sample or solvent in evaporation flask 142 can pass into a condenser 180 attached to or in communication with vapor duct 150 (illustrated in FIG. 4). Once in condenser 180 vapors can be cooled thereby causing them to re-condense and drop into collection flask 186. After the solvent has been removed (by evaporation), evaporating flask 142 can be removed from water bath 156 by raising mounting arm 154 by way of vertically adjustable member 162, which in some embodiments can comprise a track and motor or other mechanized unit.

Continuing with FIG. 7B, water bath 156 can be arranged in front of main housing 132. Such a configuration can minimize the footprint of distillation apparatus 110, particularly as compared to a distillation system where a water bath is not integrated and is instead placed or arranged on a surface adjacent to the distillation apparatus. Moreover, mounting arm 154 arranged on main housing 132 and being vertically adjustable allows for rotary evaporating assembly 140 to be raised and lowered such that sample flask 142 can be placed into or removed from water bath 156 without having to move water bath 156. By vertically orienting these components the overall footprint of the all-in-one integrated distillation apparatus 102 is greatly reduced, particularly as compared to non-integrated systems.

Condenser 180 is otherwise the same in the embodiment illustrated in FIG. 7B as in the embodiment illustrated in FIG. 7A.

In both FIGS. 7A and 7B vapor duct 150 can be directly connected to condenser 180, and particularly condenser housing 184. As such, rotary evaporating assembly 140 is directly connected to condenser 180 without the use of a dummy condenser. Thus, when mounting arm 154 moves vertically to raise or lower rotary evaporating assembly 140 condenser 180 correspondingly moves. Flexible coolant line 248 allows for such movement while maintaining fluid communication with the refrigeration system in chiller 120.

Figure 8A:
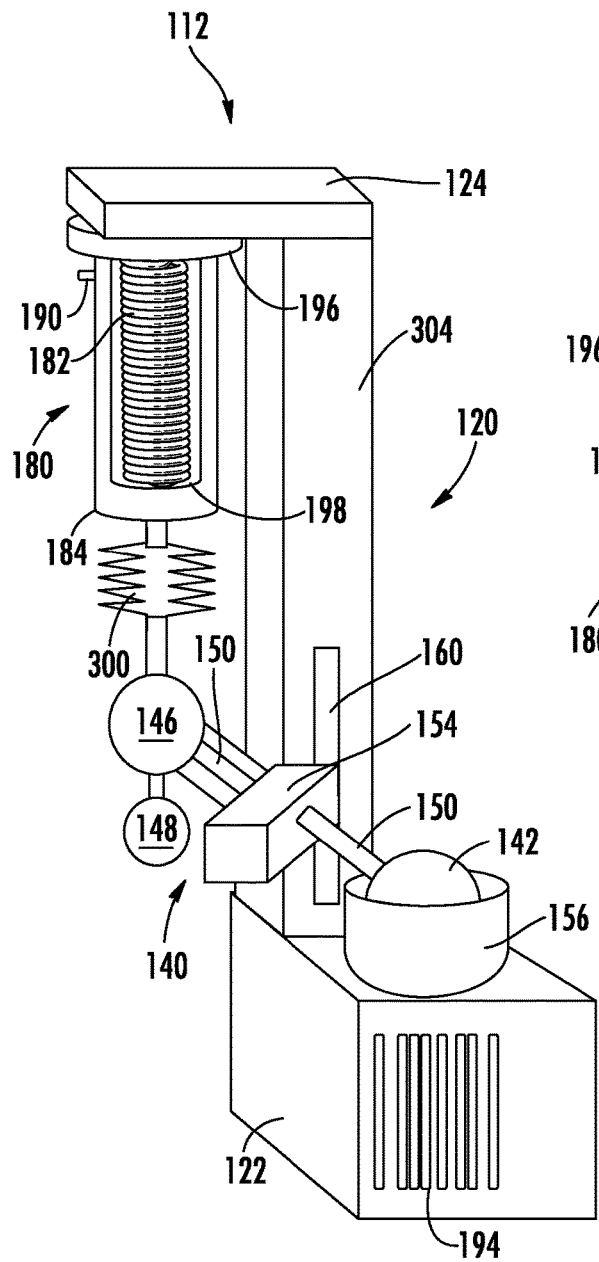
FIGS. 8A and 8B are perspective views of two embodiments of distillation apparatuses as disclosed herein.
Figure 8B:
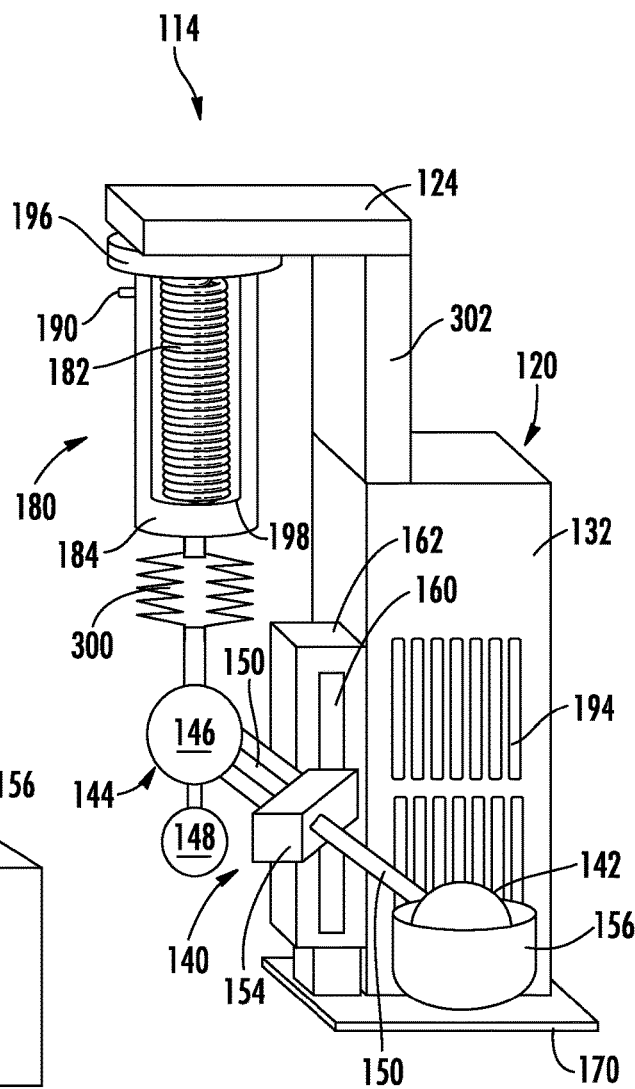

FIGS. 8A and 8B illustrate additional embodiments of distillation apparatuses 112 and 114, respectively. As depicted in FIGS. 8A and 8B, fully integrated all-in-one distillation apparatus 112 and 114, respectively, can comprise a chiller 120, a rotary evaporator assembly 140 and a condenser 180. In some embodiments, and as shown in FIGS. 8A and 8B, the chiller 120, rotary evaporator assembly 140, and a condenser 180, can be integrated into a single device or apparatus that is configured to compactly arrange the elements in such a way that provides for an effective and efficient distillation system while minimizing the operational area and/or footprint.

Continuing with FIG. 8A, distillation apparatus 112 can comprise a chiller 120. Chiller 120 can comprise in some embodiments a lower housing 122 and upper housing 304, with upper housing 304 extending substantially vertically from lower housing 122. In some embodiments chiller 120 can comprise a condenser arm 124 extending substantially horizontally from upper housing 304 and configured to support and mechanically connect condenser 180 to chiller 120. Chiller 120 can comprise an integrated refrigeration system (see FIG. 3) housed within lower housing 122 and upper housing 304, and continuing through condenser arm 124 to provide a cooled refrigerant to cool condenser 180. In some embodiments, lower housing 122 can house components of a refrigeration system (solely or in conjunction with upper housing 304), such as for example a receiving tank, compressor, refrigeration condenser and dryer (see FIG. 3), all or some of which can bee connected by refrigeration lines (copper tubing) to condenser 180 by feeding through upper housing 304 and condenser arm 124. In some embodiments lower housing 122 can comprise ventilation grates 194 configured to allow airflow into housing 122 and around the refrigeration system housed therein.

Mounting arm 154 can be mechanically linked to and can extend (substantially horizontally in some embodiments) from upper housing 304. Mounting arm 154 is otherwise similar to that described above with respect to FIG. 1A. Moreover, rotary evaporator assembly 140 and condenser 180 in FIG. 8A is similar to that described above with respect to FIG. 1A.

Turning now to the FIG. 8B, distillation apparatus 114 can comprise a chiller 120. Chiller 120 can comprise in some embodiments a main housing 132, optionally supported on platform 170, and upper housing 302. In some embodiments chiller 120 can comprise a condenser arm 134 extending substantially horizontally from upper housing 302, in some embodiments from an upper portion of upper housing 302, and configured to support and mechanically connect condenser 180 to chiller 120. Chiller 120 can comprise an integrated refrigeration system (see FIG. 3) housed within main housing 132 and continuing through condenser arm 124 to provide a cooled refrigerant to cool condenser 180. In some embodiments, main housing 132 can house components of a refrigeration system (solely or in conjunction with condenser arm 134 and/or upper housing 302), such as for example a receiving tank, compressor, refrigeration condenser and dryer (see FIG. 3), all or some of which can bee connected by refrigeration lines (copper tubing) to condenser 180 by feeding through condenser arm 134. In some embodiments main housing 132 can comprise ventilation grates 194 configured to allow airflow into housing 132 and around the refrigeration system housed therein.

Mounting arm 154 can be mechanically linked to and can extend (substantially horizontally in some embodiments) from upper housing 132. Mounting arm 154 is otherwise similar to that described above with respect to FIG. 1B. Moreover, rotary evaporator assembly 140 and condenser 180 in FIG. 8B is similar to that described above with respect to FIG. 1B.

In the embodiments depicted in FIGS. 8A and 8B an accordion element 300 is provided. Accordion element 300 can be configured to be placed between and join condenser 180, and specifically condenser housing 184, to dummy condenser 144. In such a configuration accordion element 300 can be configured to be collapsible and/or expandable so as to allow for the vertical raising and lowering of rotary evaporator assembly 140 while maintaining a connection to condenser 180 that is in a fixed position. In some embodiments lower portion 148 of dummy condenser 144 can function as a collection flask for the condensate.

FIGS. 9A through 9C illustrate components of a rotary evaporator assembly as can be utilized with the disclosed distillation apparatuses. FIG. 9A is an exploded or component view of a rotary evaporator assembly. Rotary evaporator assembly can comprise a rotary joint (vapor duct) 150 and a motor assembly 320 configured to receive rotary joint (vapor duct) 150 as depicted in FIG. 9B. Motor assembly 320 is configured to be housed within or affixed to mounting assembly 154 as show in FIGS. 1A and 1B for example. Rotary joint (vapor duct) 150 can be insertedly supported by a rotor of motor assembly 320 through a sleeve housed within motor assembly 320. Vapor duct/rotary joint 150 can act both as the axis for sample rotation, and as vacuum-tight conduit for the vapor being drawn off of the sample in sample flask 142. Sample flask 142 can be connected to one end of rotary joint 150, such as for example through opening 324 (and in some embodiments secured by clip 322), whereby sample flask 142 can be rotated integrally with rotary joint 150, as shown in assembled version in FIG. 9C. On the other end of rotary joint 150 there can in some embodiments be one or more condensers (condenser 180 and/or dummy condenser 144 as shown in FIG. 9A) connected by vapor duct 150 to receive and thereby condense vapors evaporated from sample flask 142. In some embodiments dummy condenser 144 can be used, and can comprise an upper portion 146 and lower portion 148, as well as a connector arm 328 secured to mounting arm 154 and/or motor assembly 320 and through which rotary joint 150 passes into upper portion 146. Lip 326, which can also comprise a fastener, can be configured to secure connector arm 328 to mounting arm 154 and/or motor assembly 320. In some embodiments a vacuum seal 330 can be used to create an air-tight seat at this joint. Dummy condenser 144 can comprise an outlet 332, conduit 344 and outlet/conduit 336.

Figure 10:
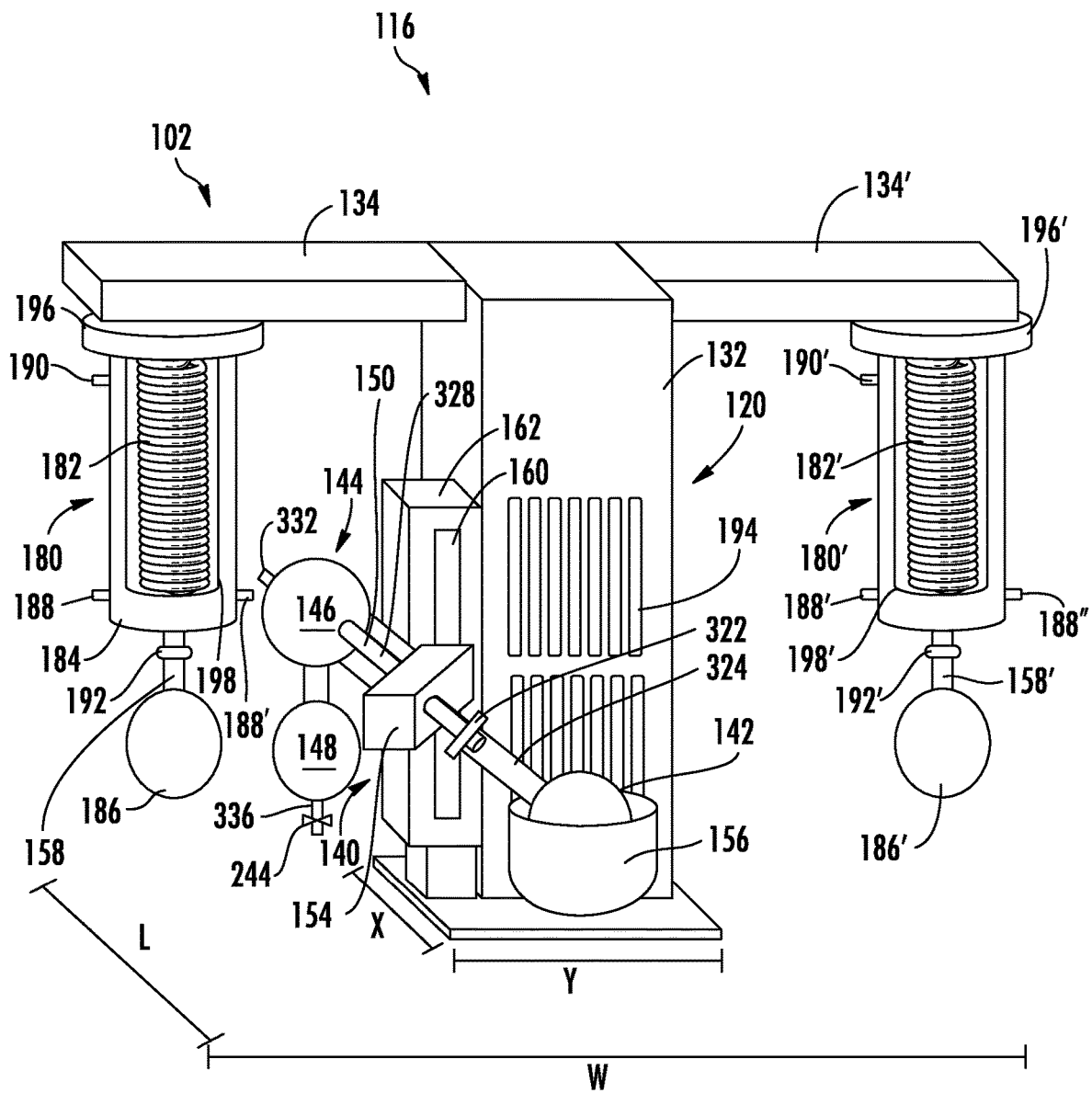
FIG. 10 is a perspective view of an embodiment of a distillation apparatus as disclosed herein.

FIG. 10 is a perspective view of a distillation apparatus as disclosed herein, with a plurality of condensers. Particularly, distillation apparatus 116 can be the same as distillation apparatus 102 in FIG. 1B, but with an additional condenser 180'. Condenser 180' can be secured by condenser arm 134' just as condenser 180 can be secured by condenser arm 134. Condenser 180' can in some embodiments function similarly to condenser 180, and can provide additional cooling capacity for use in condensing evaporates from a rotary evaporator, or other uses in a laboratory where cooling is required. Condenser 180' can be in fluid communication with the mechanical refrigeration system just as condenser 180.

Condenser 180' can be attached to condenser arm 134' by clamp 196', or other attachment mechanism, e.g. threads, screws, bolts, pressure fitting, etc. Condenser 180' can comprise condenser coil 182', condenser sleeve 198' and condenser housing 184'. Condenser coil 182' can be configured to fit or slide inside condenser sleeve 198' to form a heat exchanger or "cold finger". Condenser coil 182' can in some embodiments be double looped to increase the surface area for cooling and heat exchange. Condenser coil 182' can be fluidly connected to the integrated refrigeration system in chiller 120 such that cooled refrigerant passing through condenser coil 182' causes a cooling effect on condenser sleeve 198'. Evaporate or vapor from rotary evaporator 140 entering condenser housing 184' can come into contact with the cold surface of condenser sleeve 198' thereby causing the vapor to condense into a liquid to be collected in collection flask 186'. The configuration of condenser 180' provides an efficient mechanism for trapping all or substantially all vapors and condensing them such that environmental impacts are lessened.

In some embodiments condenser coil 182' can comprise coiled copper line that forms a continuous loop thereby providing for a continuous flow of a refrigerant material or compound to flow from the heat exchanger in condenser 180' to the mechanical refrigeration system in chiller 120. While in some embodiments condenser coil 182' can be exposed for direct cooling of evaporate (vapor), as depicted in FIG. 10 it can be concealed by condenser sleeve 198' that can comprise a chemically-resistant vapor trap made of titanium (including commercial pure grade titanium), stainless steel, metal alloys, plastic, glass, rubber, such as neoprene rubber, and/or combinations thereof. As depicted in FIG. 10, and in order to achieve a stand alone fully integrated system that minimizes space utilization, chiller 120, including mechanical refrigeration system, can be mechanically linked to and fixed with the heat exchanger/condenser 180' such that the two are provided in a single unitary device.

Condenser housing 184' can comprise a glass vessel enclosing the heat exchanger that includes condenser coil 182' and condenser sleeve 198'. Condenser housing 184 can attach to condenser arm 134' by clamp 196' to create an air-tight seal. Condenser housing 184' can comprise an entry port 188' for receiving an evaporate or vapor from rotary evaporator assembly 140, and in some embodiments a second (or more) entry port 188". A vacuum port 190' can in some embodiments be provided (in some cases near the top) and configured to receive a vacuum line from a vacuum pump to thereby cause a vacuum on the inner environment of condenser housing 184'. An evaporate or vapor that comes into contact with heat exchanger 198' in condenser 180' and thereby condenses into a liquid can collect into collection flask 186' by passing through conduit 158'. In some embodiments a joint 192' can be positioned on conduit 158' that can be configured to allow for removal of a collection flask (receiving flask) 186' without breaking a vacuum to the system during operation. Such joint 192' can comprise a valve to maintain the vacuum while removing collection flask 186'.

Although only shown with one embodiment of the distillation apparatus (FIG. 1B/FIG. 10), the double or plurality of condensers can be applied to all configurations/embodiments of distillation apparatuses disclosed herein, including but not limited to those illustrated in FIGS. 1A, 1B, 3, 4, 6A, 6B, 7A, 7B, 8A and 8B.

In some embodiments, a disclosed distillation apparatus can further comprises a system vacuum valve that can be configured to allow for removal of a receiving flask without breaking a vacuum to the system during operation.

In some aspects, the rotation can be synced with heating, i.e. the heating bath can turned on when rotation starts and goes into standby mode when rotation stops. Such a configuration can save energy and water.

In some embodiments, a cooling temperature range can be from ambient to about −150° C., or about −20° C. to about −100° C. Desired temperatures achieved through refrigeration engineering and refrigerant selection can achieve such ultra-low ranges.

In some embodiments, a distillation apparatus can comprise a vacuum seal inside the condenser, which can provide an internal vacuum seal to further guard against vacuum leak commonly associated with conventional rotary evaporators. Existing rotary evaporators have the vacuum seal located where the condenser attaches to the rotating unit. Disclosed herein is an evaporator with the vacuum seal inside the cooling unit. In such a configuration the O-ring can be accessible from inside the cooling unit. The cooling unit can be fused to the rotating unit. The O-ring can be incorporated from inside the cooling unit. This can remove the joint between the traditional condenser and the rotating unit, with the benefit of eliminating a potential vacuum leak at the joint. An internally contained O-ring seal can provide that even in the event of a slight vacuum leak there will no drop in vacuum.

The seals that connect the condenser unit with the rotating motor in existing models are not as robust as they could be. In some embodiments provided herein there are fewer joints in general to reduce the sources of leaks. In some embodiments, a rotary evaporator is provided with substantially 100% proof vacuum seal between the condenser unit and rotating unit.

It can be desirable to provide distillation apparatuses and systems that have a footprint or operational area that is a small as possible. That is, given the sometimes limited space in a laboratory or research facility equipment that takes up as little space as possible can be highly desirable. Thus, in some aspects the instant disclosure provides distillation apparatuses and systems that have a substantially reduced or smaller footprint that takes up less space than conventional distillation apparatuses and systems. Such compact designs are made possible by the unique configurations and integrations of components. In some embodiments, the footprint or operational area of a distillation apparatus can be defined by the length L, width W, and/or combination thereof (area in square inches for example) of the outer dimensions of the apparatus. Alternatively, or in addition, the footprint or operational area of a distillation apparatus can be defined by the length X, width Y, and/or combination thereof (area in square inches for example) of the dimensions of the base or platform of the housing/frame.

By way of example and not limitation, the footprint of traditional or existing rotary evaporators is about 300 to about 500 square inches, with some designs having an about 368 square inch footprint. In contrast, the presently disclosed distillation apparatuses, including chiller, condenser and rotary evaporator, can in some embodiments comprise a total footprint of about 150 square inches to about 350 square inches. For example, where the heating bath located in front of the base or housing the total footprint can be about 350 square inches (base 230 square inches and heating bath 120 square inches). In some aspects, particularly where the compact design includes a heating bath on top of the base or housing, the footprint of the heating bath is removed. Thus, the total footprint of a compact design of a disclosed distillation apparatus can be about 150 square inches to about 230 square inches.

In some embodiments, the rotary stand and heating or water bath can be mounted on top of the chiller housing. Such a configuration can significantly decrease the overall footprint of the unit. The more compact design can take advantage of a shorter refrigeration compressor height, such as for example about 6 inches, about 8 inches, or about 10 inches, which in turn provides sufficient space for the heating bath to be positioned above the compressor (housed inside the chiller housing) and the rotating stand above the condenser. In some aspects, a refrigeration condenser can have a height of about 8 inches, or about 10 inches, or about 12 inches.

In some embodiments, including the compact design disclosed herein, the heating bath can move horizontally. Likewise, in some aspects the rotating stand can move vertically. Other components, such as the cooling coil, the electric switch board, and/or the receiving can be optimally positioned to allow for a reduced footprint. The electronic control unit, for example, can be ergonomically located in front of the housing of the chiller.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, dose, sequence identity (e.g., when comparing two or more nucleotide or amino acid sequences), mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. An integrated distillation apparatus, comprising:
   a rotary evaporator assembly configured to evaporate a sample;
   a condenser configured to condense an evaporated sample; and
   a refrigeration system configured to cool the condenser, wherein the refrigeration system comprises a compressor, refrigeration condenser, dryer and refrigerant,
   wherein the condenser is affixed to the apparatus by a condenser arm extending from the apparatus and adjacent to the rotary evaporator assembly, and
   wherein the refrigeration system is in fluid communication with the condenser.

2. The integrated distillation apparatus of claim 1, wherein the condenser can be attached to condenser arm by an attachment mechanism.

3. The integrated distillation apparatus of claim 1, wherein the condenser comprises a cooling coil and condenser housing.

4. The integrated distillation apparatus of claim 3, wherein the condenser housing comprises a glass vessel configured to enclose or otherwise surround the cooling coil.

5. The integrated distillation apparatus of claim 4, wherein the condenser comprises a titanium sleeve surrounding the cooling coil, whereby the titanium sleeve is cooled by the cooling coil, wherein an evaporate from the rotary evaporator assembly comes into contact with the titanium sleeve and condenses.

6. The integrated distillation apparatus of claim 4, wherein the condenser comprises metal alloy sleeve surrounding the cooling coil, whereby the metal alloy sleeve is cooled by the cooling coil, wherein an evaporate from the rotary evaporator assembly comes into contact with the metal alloy sleeve and condenses.

7. The integrated distillation apparatus of claim 3, wherein the condenser further comprises a condenser sleeve, wherein the cooling coil is configured to fit or slide inside condenser sleeve to form a heat exchanger.

8. The integrated distillation apparatus of claim 7, wherein the condenser sleeve comprises a tubular structure with an enclosed lower end and open upper end, and having a diameter sufficient to receive or slidingly engage the coil.

9. The integrated distillation apparatus of claim 8, wherein the condenser sleeve comprises a collar configured to mechanically engage condenser arm to thereby removably secure condenser sleeve to the condenser arm.

10. The integrated distillation apparatus of claim 3, wherein the cooling coil comprises at least two loops to increase a surface area for cooling and heat exchange.

11. The integrated distillation apparatus of claim 3, wherein the cooling coil is in fluid communication with the refrigeration system.

12. The integrated distillation apparatus of claim 3, wherein the cooling coil comprises coiled copper line that forms a continuous loop thereby providing for a continuous flow of a refrigerant material or compound to flow from the heat exchanger in the condenser to the refrigeration system.

13. The integrated distillation apparatus of claim 1, further comprising a collection vessel configured to collect a condensate, wherein the collection vessel comprises a first and second compartment divided by a vacuum valve, wherein the first compartment can be removed to collect the condensate while the vacuum valve preserves the vacuum on the evaporator and the second compartment continues to collect condensate.

14. The integrated distillation apparatus of claim 1, wherein the rotary evaporator assembly, condenser and refrigeration system are integrated into a single structure.

15. The integrated distillation apparatus of claim 14, further comprising a frame structure configured to house the rotary evaporator assembly, condenser and refrigeration system, and structurally support the rotary evaporator assembly and condenser, wherein the frame structure is configured to support the condenser in a fixed position while supporting the rotary evaporator assembly in a movable position, wherein each of the rotary evaporator assembly, condenser and refrigeration system is integrated into a single apparatus.

16. The integrated distillation apparatus of claim 15, wherein the rotary evaporator assembly is movably attached to the structure and configured to be vertically translatable in position.

17. The integrated distillation apparatus of claim 1, further comprising a motor configured to provide a rotational force to the rotary evaporator assembly.

18. The integrated distillation apparatus of claim 1, further comprising a heated water bath into which a sample container of the rotary evaporator assembly can be submerged.

19. The integrated distillation apparatus of claim 1, wherein the refrigeration system is configured to cool the condenser from about ambient temperature to about −100° C.

* * * * *